(12) United States Patent
Imamura

(10) Patent No.: US 8,116,708 B2
(45) Date of Patent: Feb. 14, 2012

(54) WIRELESS RECEIVER

(75) Inventor: Kimihiko Imamura, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/693,058

(22) Filed: Jan. 25, 2010

(65) Prior Publication Data

US 2010/0120388 A1     May 13, 2010

Related U.S. Application Data

(62) Division of application No. 12/089,361, filed as application No. PCT/JP2006/321608 on Oct. 30, 2006.

(30) Foreign Application Priority Data

Oct. 31, 2005   (JP) .................................. 2005-316549

(51) Int. Cl.
    *H04Q 7/20*        (2006.01)
(52) U.S. Cl. ..................... 455/205; 455/216; 455/550.1; 455/553.1; 455/426.1; 455/500; 370/310; 370/343; 370/328; 370/270
(58) Field of Classification Search .................. 455/205, 455/216, 230, 231, 550.1, 552.1, 553.1, 426.1, 455/426.2, 500, 517, 422.1, 403; 370/310, 370/343, 328, 329, 270, 341
    See application file for complete search history.

(56) References Cited

U.S. PATENT DOCUMENTS

| 4,856,025 | A | 8/1989 | Takai |
| 5,991,331 | A | 11/1999 | Chennakeshu et al. |
| 6,034,987 | A | 3/2000 | Chennakeshu et al. |
| 6,131,016 | A | 10/2000 | Greenstein et al. |
| 6,249,250 | B1 | 6/2001 | Namekata et al. |
| 6,650,910 | B1 | 11/2003 | Mazur et al. |
| 6,731,619 | B1 * | 5/2004 | Ramesh et al. |
| 6,807,145 | B1 | 10/2004 | Weerackody et al. |
| 6,842,487 | B1 | 1/2005 | Larsson |
| 6,862,456 | B2 * | 3/2005 | Sugar et al. |
| 6,892,059 | B1 | 5/2005 | Kim et al. |

(Continued)

FOREIGN PATENT DOCUMENTS

CN           1320308 A      10/2001

(Continued)

OTHER PUBLICATIONS

Search Report issued on Eurasian Patent Application No. 200802301 with English Translation.

(Continued)

*Primary Examiner* — Keith T Ferguson
(74) *Attorney, Agent, or Firm* — Birch, Stewart, Kolasch & Birch, LLP

(57) ABSTRACT

A wireless receiver that includes a reception unit which, in the case in which the frequency bandwidth of the chunk is Fc, receives a) data to which phase rotation for controlling the maximum delay time between the plurality of transmission antennas is added so that the maximum delay time is set to either a predetermined first value which is smaller than 1/Fc or a predetermined second value which is larger than 1/Fc depending on whether transmission is performed using frequency diversity or transmission is performed using multi-user diversity and b) pilot channels corresponding to the plurality of transmission antennas which are orthogonal to each other; and a demodulating unit which demodulates the data based on transfer functions calculated using the pilot channels.

2 Claims, 24 Drawing Sheets

U.S. PATENT DOCUMENTS

| | | | |
|---|---|---|---|
| 6,980,612 B1 | 12/2005 | Miyoshi | |
| 7,002,939 B1 | 2/2006 | Hiramatsu | |
| 7,065,156 B1* | 6/2006 | Kuchi | |
| 7,277,469 B2 | 10/2007 | Brunel | |
| 7,298,797 B2 | 11/2007 | Hwang et al. | |
| 7,436,903 B2 | 10/2008 | Sandhu et al. | |
| 7,672,388 B2 | 3/2010 | Frank | |
| 7,676,007 B1 | 3/2010 | Choi et al. | |
| 7,742,533 B2 | 6/2010 | Aoki et al. | |
| 7,792,206 B2 | 9/2010 | Ylitalo et al. | |
| 2002/0186785 A1 | 12/2002 | Hoshino et al. | |
| 2002/0196734 A1 | 12/2002 | Tanaka et al. | |
| 2003/0086371 A1 | 5/2003 | Walton et al. | |
| 2003/0099216 A1 | 5/2003 | Nilsson et al. | |
| 2003/0148738 A1 | 8/2003 | Das et al. | |
| 2003/0169682 A1* | 9/2003 | Chen et al. | 370/206 |
| 2004/0038651 A1 | 2/2004 | Okuhata | |
| 2004/0137948 A1 | 7/2004 | Benning et al. | |
| 2004/0235433 A1 | 11/2004 | Hugl et al. | |
| 2004/0266354 A1 | 12/2004 | Hamada et al. | |
| 2005/0048933 A1 | 3/2005 | Wu et al. | |
| 2005/0084000 A1 | 4/2005 | Krauss et al. | |
| 2005/0099937 A1 | 5/2005 | Oh et al. | |
| 2005/0113041 A1* | 5/2005 | Polley et al. | |
| 2005/0141641 A1 | 6/2005 | Tanaka et al. | |
| 2005/0201268 A1 | 9/2005 | Aoki et al. | |
| 2005/0215224 A1 | 9/2005 | Hamamoto | |
| 2005/0220199 A1 | 10/2005 | Sadowsky et al. | |
| 2005/0254592 A1 | 11/2005 | Naguib et al. | |
| 2005/0265226 A1 | 12/2005 | Shen et al. | |
| 2005/0281240 A1 | 12/2005 | Oh et al. | |
| 2005/0286648 A1 | 12/2005 | Feng et al. | |
| 2006/0013186 A1 | 1/2006 | Agrawal et al. | |
| 2006/0057969 A1 | 3/2006 | Van Houtum | |
| 2006/0068791 A1 | 3/2006 | Lindoff | |
| 2006/0120473 A1 | 6/2006 | Baum | |
| 2006/0146721 A1 | 7/2006 | Attar et al. | |
| 2006/0234643 A1 | 10/2006 | Kikuchi | |
| 2006/0239226 A1* | 10/2006 | Khan | 370/329 |
| 2006/0270433 A1* | 11/2006 | Kelton et al. | |
| 2006/0274854 A1 | 12/2006 | Matsumoto et al. | |
| 2007/0004465 A1 | 1/2007 | Papasakellariou et al. | |
| 2007/0008946 A1 | 1/2007 | Kim | |
| 2007/0104288 A1 | 5/2007 | Kim | |
| 2008/0063012 A1 | 3/2008 | Nakao et al. | |
| 2009/0081967 A1 | 3/2009 | Imamura | |
| 2009/0129492 A1 | 5/2009 | Hamaguchi et al. | |
| 2009/0135940 A1 | 5/2009 | Imamura | |

FOREIGN PATENT DOCUMENTS

| | | |
|---|---|---|
| CN | 1338162 A | 2/2002 |
| CN | 1674572 A | 9/2005 |
| CN | 1674574 A | 9/2005 |
| EP | 1 531 594 A1 | 5/2005 |
| EP | 1 605 607 A1 | 12/2005 |
| JP | 03-201832 | 9/1991 |
| JP | 11-088030 | 3/1999 |
| JP | 11-205026 A | 7/1999 |
| JP | 2001-69050 A | 3/2001 |
| JP | 2001-168777 A | 6/2001 |
| JP | 2005-191997 A | 7/2005 |
| JP | 4302761 B2 | 7/2009 |
| JP | 4347410 B2 | 7/2009 |
| JP | 4382144 B2 | 10/2009 |
| JP | 4384710 B2 | 10/2009 |
| RU | 2 141 168 C1 | 11/1999 |
| WO | WO 01/54305 A1 | 7/2001 |
| WO | WO-02/07341 A2 | 1/2002 |
| WO | WO 02/51031 | 6/2002 |
| WO | WO 03/026335 | 3/2003 |
| WO | WO 2005/060108 A2 | 6/2005 |
| WO | WO 2005/099211 A1 | 10/2005 |
| WO | WO 2005/117321 A1 | 12/2005 |

OTHER PUBLICATIONS

Search Report issued on Eurasian Patent Application No. 200802302 with English Translation.
Search Report issued on Eurasian Patent Application No. 200802303 with English Translation.
"Downlink Multiple Access Scheme for Evolved UTRA", 3GPP TSG RAN WG1 Meeting #40bis, Beijing, China, Apr. 4-8, 2005, R1-050249.
"Physical Channels and Multiplexing in Evolved UTRA Downlink", 3GPP TSG RAN WG1 Ad Hoc on LTE, Sophia Antipolis, France, Jun. 20-21, 2005, R1-050590.
Auer, G.: "Channel Estimation by Set Partitioning for OFDM with Cyclic Delay Diversity" 2004 IEEE, Sep. 26, 2004, pp. 669-673.
European Search Report for 06822565.5 dated Feb. 4, 2010.
European Search Report for 06842886.1 dated Jun. 8, 2010.
European Search Report for 08021641.9 dated Feb. 4, 2010.
European Search Report for 08021643.5 dated Feb. 2, 2010.
European Search Report for 09010708.7 dated Jun. 8, 2010.
Office Action dated Dec. 16, 2010 for U.S. Appl. No. 12/773,684.
Office Action dated Jan. 18, 2011 for U.S. Appl. No. 12/551,351.
Office Action dated Jan. 18, 2011 for U.S. Appl. No. 12/692,986.
Office Action dated Jan. 20, 2011 for U.S. Appl. No. 12/551,385.
Office Action dated Jan. 21, 2011 for U.S. Appl. No. 12/091,430.
Office Action dated Jan. 25, 2011 for U.S. Appl. No. 12/551,368.
Samsung, 3GPP TSG RAN WG1 Meeting #42bis San Diego, USA, Oct. 10-14, 2005, pp. 1-5, R1-051046.
Samsung, CQI report and scheduling procedure, 3GPP TSG-RAN WG1 Meeting #42bis Tdoc R1-051045, Oct. 10-14, 2005, pp. 1-4.
Office Action dated Jan. 21, 2011 for U.S. Appl. No. 12/547,238.
Dammann et al., "Transmit/Receive-Antenna Diversity Techniques of OFDM Systems", European Transactions on Telecommunications, Wiley & Sons, Chichester, GB, vol. 13, No. 5, Sep. 1, 2001, pp. 531-538, XP002348091, ISSN: 1124-318X.
Office Action dated Jan. 31, 2011 for U.S. Appl. No. 12/823,853.
Search Report dated Jan. 21, 2011 for European Application No. 0679294.3.
Ericsson, "Some aspects of single-carrier transmission for E-UTRA," 3GPP TSG-RAN WG1 #42, London, UK, R1-050765, Aug. 29-Sep. 2, 2005, 5 pages.
Samsung Electronics Co. Ltd., "Enhanced Frequency Diversity and Scheduling Performance in Evolved UTRA," 3GPP TSG RAN WG1 Meeting #42, London, UK, R1-050888, Aug. 29-Sep. 2, 2005, pp. 1-16.
Samsung, "System Performance of Adaptive Cyclic Delay Diversity (ACDD) Scheme," 3GPP TSG RAN WG1 Meeting #42bis, San Diego, USA, R1-051047, Oct. 10-14, 2005, pp. 1-9.
U.S. Office Action, dated Mar. 14, 2011, for U.S. Appl. No. 12/065,051.
U.S. Office Action, dated Mar. 8, 2011, for U.S. Appl. No. 12/642,667.
U.S. Office Action, dated Mar. 9, 2011, U.S. Appl. No. 12/326,557.
U.S. Office Action, dated Mar. 9, 2011, for U.S. Appl. No. 12/326,581.
Notice of Allowance dated Apr. 19, 2011 for U.S. Appl. No. 12/091,430.
Office Action dated Mar. 23, 2011 for U.S. Appl. No. 12/547,238.
Office Action dated Mar. 28, 2011 for U.S. Appl. No. 12/823,886.
Office Action dated May 2, 2011 for U.S. Appl. No. 12/823,853.
Office Action dated Sep. 20, 2010 for U.S. Appl. No. 12/547,238.
U.S. Notice of Allowance, dated Jun. 20, 2011, for U.S. Appl. No. 12/326,581.
U.S. Notice of Allowance, dated May 5, 2011, for U.S. Appl. No. 12/551,385.
U.S. Office Action, dated May 16, 2011, for U.S. Appl. No. 12/692,986.
U.S. Office Action, dated May 26, 2011, for U.S. Appl. No. 12/551,368.
U.S. Office Action, dated May 6, 2011, for U.S. Appl. No. 12/823,886.
U.S Notice of Allowance issued in U.S. Appl. No. 12/642,667 on Jul. 14, 2011.
U.S. Office issued in U.S. Appl. No. 12/326,568 on Jul. 13, 2011.
U.S. Notice of Allowance issued in U.S. Appl. No. 12/326,557 on Oct. 25, 2011.
U.S. Notice of Allowance issued in U.S. Appl. No. 12/326,568 on Oct. 31, 2011.
U.S. Notice of Allowance issued in U.S. Appl. No. 12/692,986 on Oct. 12, 2011.
U.S. Office Action issued in U.S. Appl. No. 12/823,886 on Oct. 19, 2011.
U.S. Office Action issued in U.S. Appl. No. 12/089,361 on Dec. 2, 2011.

* cited by examiner

FIG. 6A
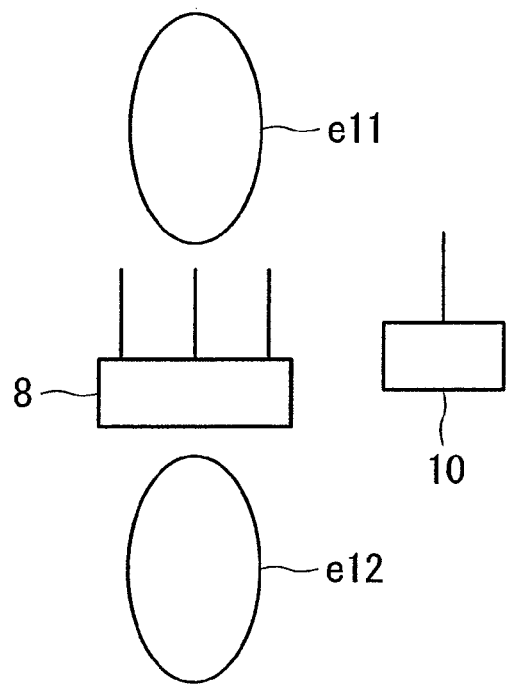
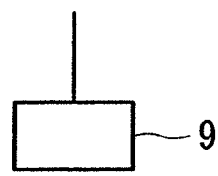
FIG. 6B
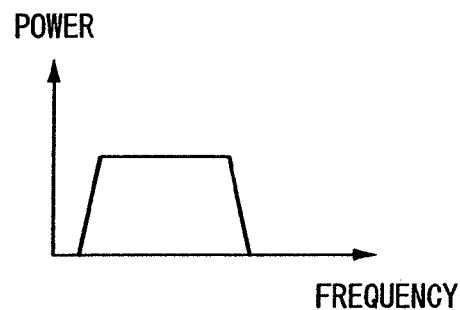
FIG. 6C
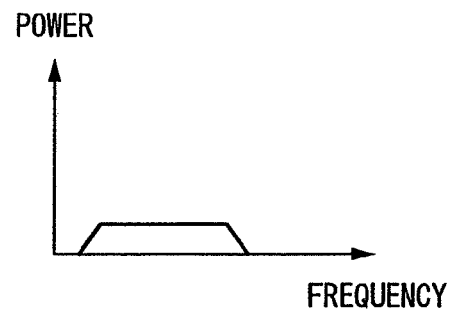

FIG. 11
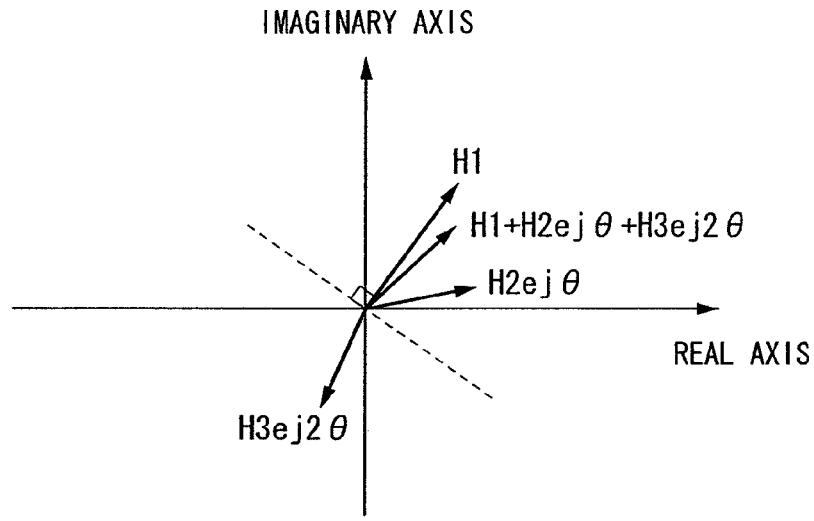
FIG. 12
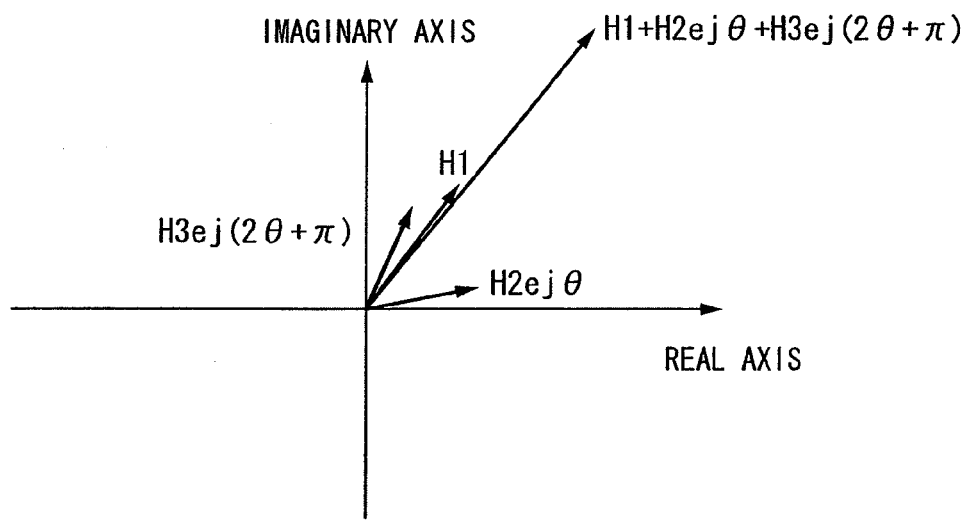
FIG. 13
| ANTENNA NUMBER | #1 | #2 | #3 |
|---|---|---|---|
| NECESSITY OF PHASE INVERSION | 0 | 0 | 1 |

FIG. 20

| ANTENNA NUMBER | #1 | #2 | #3 |
|---|---|---|---|
| PILOT CHANNEL | 0 | 0 | 0 |
| DATA SIGNAL | 0 | $2\pi mT/Ts$ | $2\pi m2T/Ts+\pi$ |

FIG. 21

| ANTENNA NUMBER | #1 | #2 | #3 |
|---|---|---|---|
| PILOT CHANNEL | 0 | 0 | $\pi$ |
| DATA SIGNAL | 0 | $2\pi mT/Ts$ | $2\pi m2T/Ts+\pi$ |

| ANTENNA NUMBER | #1 | #2 | #3 |
|---|---|---|---|
| PHASE ROTATION AMOUNT | 0 | $\theta 2$ | $\theta 3$ |

FIG. 29

| ANTENNA NUMBER | #1 | #2 | #3 |
|---|---|---|---|
| PILOT CHANNEL | 0 | 0 | 0 |
| DATA SIGNAL | 0 | $2\pi mT/Ts+\theta 2$ | $2\pi m2T/Ts+\theta 3$ |

FIG. 30

| ANTENNA NUMBER | #1 | #2 | #3 |
|---|---|---|---|
| PILOT CHANNEL | 0 | $\theta 2$ | $\theta 3$ |
| DATA SIGNAL | 0 | $2\pi mT/Ts+\theta 2$ | $2\pi m2T/Ts+\theta 3$ |

WIRELESS RECEIVER

This application is a Divisional of co-pending application Ser. No. 12/089,361, filed on Apr. 4, 2008, which is a National Phase of PCT/JP2006/321608 filed on Oct. 30, 2006 which claims priority under 35 U.S.C. 119(a) to Patent Application No. JP 2005-316549 filed in Japan on Oct. 31, 2005, the entire contents of which are hereby incorporated by reference.

TECHNICAL FIELD

The present invention relates to a wireless receiver.

BACKGROUND ART

In recent years, primarily in multicarrier transmission systems, a method has been proposed in which scheduling of users is performed by dividing into multiple blocks in frequency and time domains. Here, the regions which are defined in frequency and time domains and are secured when users perform communications are called allocated slots, and the blocks that form the basis when determining the allocated slots are called chunks.

Amongst these, a method has been proposed that, when transmitting broadcast/multicast channels or control channels, blocks which are wide in the frequency direction are allocated to obtain a frequency diversity effect, which ensures few errors even with low receiving power, and when transmitting unicast signals that involve one-on-one communication between a wireless transmitter and a wireless receiver, blocks which are narrow in the frequency direction are allocated to obtain a multi-user diversity effect (for example, refer to non-patent document 1 and non-patent document 2).

FIG. 31 and FIG. 32 show the relationship between time (vertical axis) and frequency (horizontal axis) in signals transmitted from a wireless transmitter to a wireless receiver. In FIG. 31, the vertical axis represents time, and the horizontal axis represents frequency. In the time domain, five transmission times t1 to t5 are established. Each transmission time t1 to t5 has the same time width. In the frequency domain, four transmission frequencies f1 to f4 are established. Each transmission frequency f1 to f4 has the same frequency width Fc. In this manner, the transmission times t1 to t5 and the transmission frequencies f1 to f4 establish 20 chunks K1 to K20 as shown in FIG. 31.

In addition, as shown in FIG. 32, four chunks K1 to K4 are combined in the frequency direction, and divided into three in the time domain direction to establish allocated slots S1 to S3 each having a time width of t1/3 and a frequency width of 4f1. Allocated slot S1 is allocated to a first user, allocated slot S2 is allocated to a second user, and allocated slot S3 is allocated to a third user. Accordingly, the first to third users are able to obtain a frequency diversity effect.

Next, chunk K5 is allocated to a fourth user as allocated slot S4. Chunks K6 and K7 are combined and allocated to a fifth user as allocated slot S5. Chunk K8 is allocated to a sixth user as allocated slot S6. Accordingly, the fourth to sixth users are able to obtain a multi-user diversity effect.

Next, chunks K9 and K11 are allocated to a seventh user as allocated slot S7. Chunks K10 and K12 are combined, and divided into three in the time domain direction, to establish communication slots S8 to S10 each having a time width of t3/3 and a frequency width of 2f2. Allocated slot S8 is allocated to an eighth user, allocated slot S9 is allocated to a ninth user, and allocated slot S10 is allocated to a tenth user. Accordingly, the seventh to tenth users are able to obtain a frequency diversity effect.

Next, chunk K13 is allocated to an eleventh user as allocated slot S11. Chunk K14 is allocated to a twelfth user as allocated slot S12. Chunks K15 and K16 are combined and allocated to a thirteenth user as allocated slot S13. Accordingly, the eleventh to thirteenth users are able to obtain a multi-user diversity effect.

Next, chunks K17 and K19 are allocated to a fourteenth user as allocated slot S14. Chunks K18 and K20 are combined, and divided into three in the time domain direction, to establish allocated slots S15 to S17 each having a time width of t5/3 and a frequency width of 2f2. Allocated slot S15 is allocated to a fifteenth user, allocated slot S16 is allocated to a sixteenth user, and allocated slot S17 is allocated to a seventeenth user. Accordingly, the fourteenth to seventeenth users are able to obtain a frequency diversity effect.

[Non-patent document 1] "Downlink Multiple Access Scheme for Evolved UTRA", [online], Apr. 4, 2005, R1-050249, 3GPP, [search conducted on Aug. 17, 2005], Internet<URL: ftp://ftp.3gpp.org/TSG_RAN/WG1_RL1/TSGR1_40bis/Docs/R1-050249.zip>

[Non-patent document 2] "Physical Channel and Multiplexing in Evolved UTRA Downlink", [online], Jun. 20, 2005, R1-050590, 3GPP, [search conducted on Aug. 17, 2005], Internet<URL: ftp://ftp.3gpp.org/TSG_RAN/WG1_RL1/R1_Ad_Hocs/LTE_AH_JUNE-05/Docs/R1-05 0590.zip>

DISCLOSURE OF INVENTION

Problems to be Solved by the Invention

The problem to be solved is that in conventional proposed communication systems, it is not possible to obtain an adequate multi-user diversity effect depending on the allocated slot and the location of the wireless receiver.

Means for Solving the Problem

The wireless receiver of the present invention includes: a reception unit which, in the case in which the frequency bandwidth of the chunk is Fc, receives a) data to which phase rotation for controlling the maximum delay time between the plurality of transmission antennas is added so that the maximum delay time is set to either a predetermined first value which is smaller than 1/Fc or a predetermined second value which is larger than 1/Fc depending on whether transmission is performed using frequency diversity or transmission is performed using multi-user diversity and b) pilot channels corresponding to the plurality of transmission antennas which are orthogonal to each other; and a demodulating unit which demodulates the data based on transfer functions calculated using the pilot channels.

Moreover, in the wireless receiver of the present invention, the first value is zero.

Effects Of The Invention

The terminal apparatus of the present invention estimates channels with the base station antennas corresponding to respective pilot channels, and based on the result of applying a predetermined amount of phase rotation to the result of the channel estimation, selects a base station antenna where applying phase rotation improves the communication state, and calculates the phase rotation amount. Consequently, there is the advantage that a favorable multi-user diversity effect can be obtained.

Furthermore, the base station apparatus of the present invention applies phase rotation to respective subcarriers, based on an identification of a base station antenna selected so as to improve the communication state, or a phase rotation amount calculated so as to improve the communication state, which are included in the received signal. Consequently, there is the advantage that a favorable multi-user diversity effect can be obtained.

BRIEF DESCRIPTION OF THE DRAWINGS

FIG. 6A is an explanatory drawing of a situation where the same signal is transmitted from multiple antennas in the first embodiment without adding delay.

FIG. 6B is an explanatory drawing of a situation where the same signal is transmitted from multiple antennas in the first embodiment without adding delay.

FIG. 6C is an explanatory drawing of a situation where the same signal is transmitted from multiple antennas in the first embodiment without adding delay.

FIG. 11 is a diagram showing the transfer function between respective transmission antennas and a reception antenna, and the transfer function of the combined wave thereof in the first embodiment.

FIG. 12 is a diagram showing the transfer function between respective transmission antennas and a reception antenna, and the transfer function of the combined wave thereof in the first embodiment.

FIG. 13 is a diagram showing the antenna number notification signal that is notified from the terminal apparatus to the base station apparatus in the first embodiment.

FIG. 20 is a diagram showing a phase control signal used in the base station apparatus of the first embodiment.

FIG. 21 is a diagram showing a phase control signal used in the base station apparatus of the first embodiment.

FIG. 29 is a diagram showing a phase control signal used in the base station apparatus of the second embodiment.

FIG. 30 is a diagram showing a phase control signal used in the base station apparatus of the second embodiment.

DESCRIPTION OF THE REFERENCE SYMBOLS

1 Wireless transmitter; 2, 3, 4 Transmission antenna; 5, 6 Delay device; 7 Wireless receiver; 8 Wireless transmitter; 9, 10 Wireless receiver; 11 Reception antenna; 17 MAC unit; 18 Physical layer unit; 21 Transmission circuit unit; 22, 122 Reception circuit unit; 23 Wireless frequency converting unit; 24 Antenna unit; 33 A/D converting unit; 34 GI removing unit; 35 S/P converting unit; 36 FFT unit; 37 Pilot channel extracting unit; 38 Channel compensating unit; 39 Demodulating unit; 40 Error correction decoding unit; 41-1, 2, 3

Antenna-specific channel estimating unit; 42 Channel estimating unit; 43 Phase rotating unit; 44 Adding unit; 45 Switch unit; 46 Control unit; 47 Inversion antenna selecting unit; 48-1, 2, 3 Antenna-specific channel estimating unit; 49 Averaging unit; 50 Code multiplying unit; 51 Despreading unit; 65 PDCP unit; 66 RLC unit; 67 MAC unit; 68 Physical layer unit; 69 Scheduling unit; 70, 170 Transmission circuit controlling unit; 71 Transmission circuit unit; 72 Reception circuit unit; 73 Wireless frequency converting unit; 74, 75, 76 Antenna unit; 81a, b User-specific signal processing unit; 82 Error correction encoding unit; 83 Modulating unit; 84 Subcarrier allocating unit; 85 Pilot channel inserting unit; 86 Phase rotating/weight multiplying unit; 87 IFFT unit; 88 Parallel/serial converting unit; 89 GI adding unit; 90 Filter unit; 91 D/A converting unit; 101-1, 2, 3 Antenna-specific signal processing unit; 102 Pilot signal generating unit; 103 Weight calculating unit; 147 Phase rotation amount calculating unit

BEST MODE FOR CARRYING OUT THE INVENTION

First Embodiment

Figure 1:
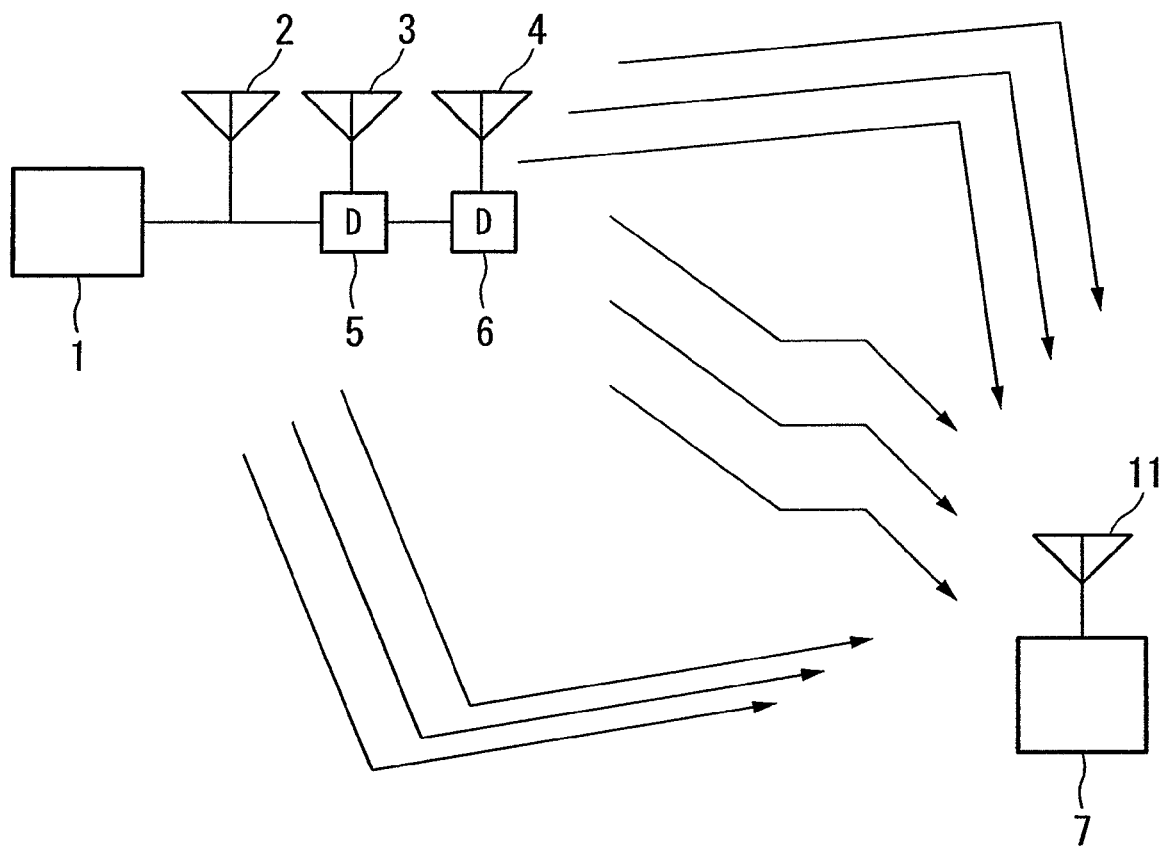
FIG. 1 is a block diagram showing the construction of a communication system in accordance with a first embodiment of this invention.

A first embodiment of the present invention is described below with reference to the drawings. FIG. 1 is a block diagram showing the structure of a communication system in accordance with the present embodiment. FIG. 1 shows that signals transmitted by a wireless transmitter 1 travel through a plurality of channels and arrive at a wireless receiver 7. The wireless transmitter 1 has a plurality of transmission antennas 2 to 4, and signals are sent from the respective transmission antennas 2 to 4 with different delay times, 0, T, and 2T applied to the respective transmission antennas. The wireless receiver 7 receives the signals transmitted from the wireless transmitter 1. In FIG. 1, a case is described by way of example, in which the wireless transmitter 1 includes three transmission antennas 2 to 4. The plurality of transmission antennas mentioned here are, by way of example, the antennas installed in a wireless transmitter serving as a base station facility for cellular phones or the like, and can be any of three kinds of antenna namely; within the same sector, within the same base station but in different sectors, or in different base stations. Here as an example, a case in which the antennas are installed in the same sector is described, but other configurations may also be adopted. Furthermore, the delay time T is applied by delay devices 5 and 6 in the figure, that apply a delay time of T at transmission antenna 3, and a delay time of 2T at transmission antenna 4, as mentioned above.

Figure 2A:
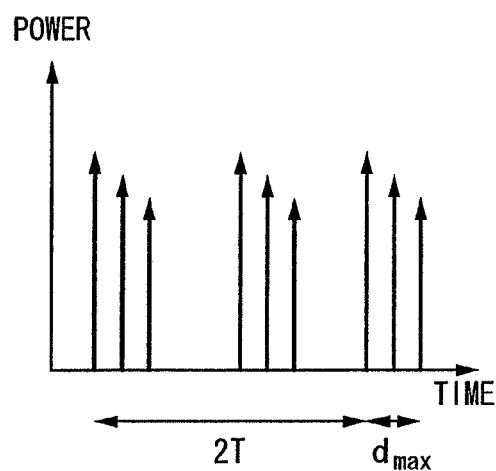
FIG. 2A is a diagram showing a delay profile of the first embodiment.
Figure 2B:
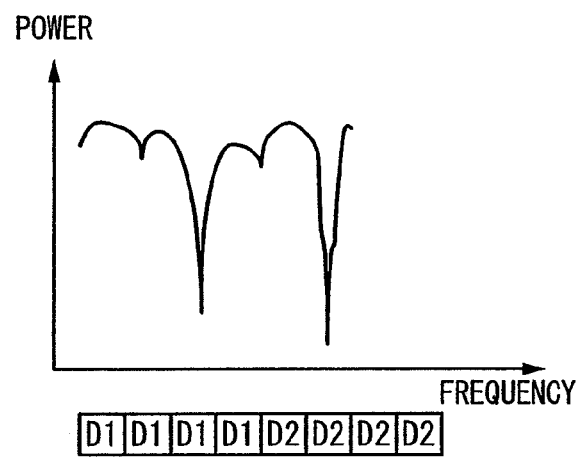
FIG. 2B is a diagram showing a transfer function of the first embodiment.

FIG. 2A and FIG. 2B are diagrams showing the delay profile and transfer function of signal that reach the wireless receiver through a plurality of (three) channels with different delay times. FIG. 2A shows a delay profile in terms of time (horizontal axis) and power (vertical axis) of transmission signals that reach a wireless receiver through a plurality of channels with different delay times. As shown in FIG. 2A, the instantaneous delay profile has a maximum delayed wave of 2T+dmax, which is a greater maximum delayed wave than if the same signal were transmitted from the respective transmission antennas. Here, dmax indicates the difference between the arrival times of the radio waves that traveled from the transmission antennas to the reception antenna over the fastest channel and those that traveled over slower channels.

FIG. 2B shows a transfer function in terms of frequency (horizontal axis) and power (vertical axis) obtained by frequency-converting the delay profile in FIG. 2A. In this manner, an increase in the maximum delay time 2T+dmax in the delay profile means more rapid variation in the transfer function due to frequency. Accordingly, as shown in FIG. 2B, data D1 and D2 are each spread at a spreading factor of four and subcarriers are allocated. Preferably the spreading factor or the coding rate of an error-correcting code is controlled on the wireless transmitter 1 side in accordance with the variation in the transfer function due to frequency. However, in the above method, because the delay time 2T is already known at the wireless transmitter 1 side, the spreading factor or code rate of the error-correcting code can be determined without regard to the variation of the channel due to frequency.

Figure 3A:
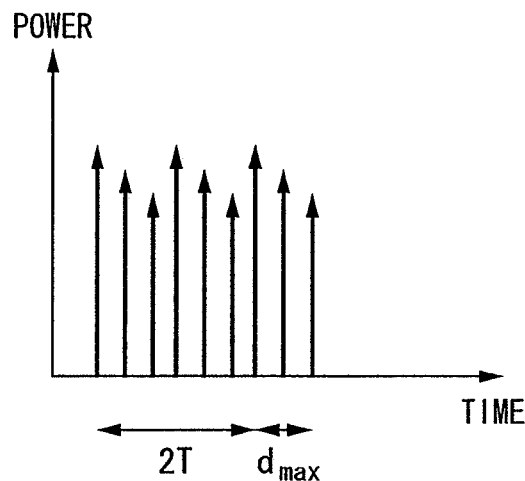
FIG. 3A is a diagram showing a delay profile of the first embodiment.
Figure 3B:
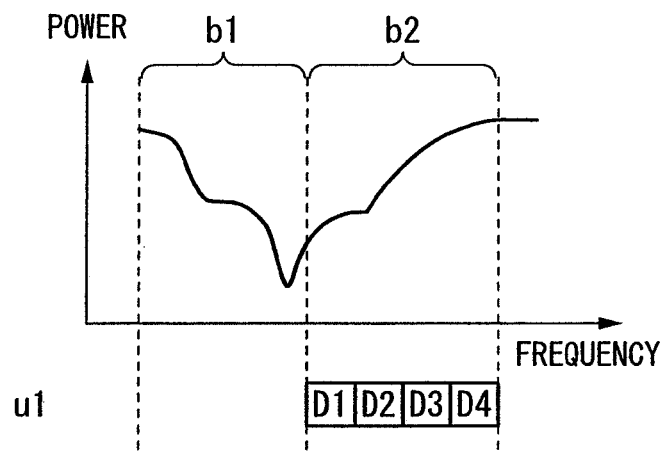
FIG. 3B is a diagram showing a transfer function of the first embodiment.
Figure 3C:
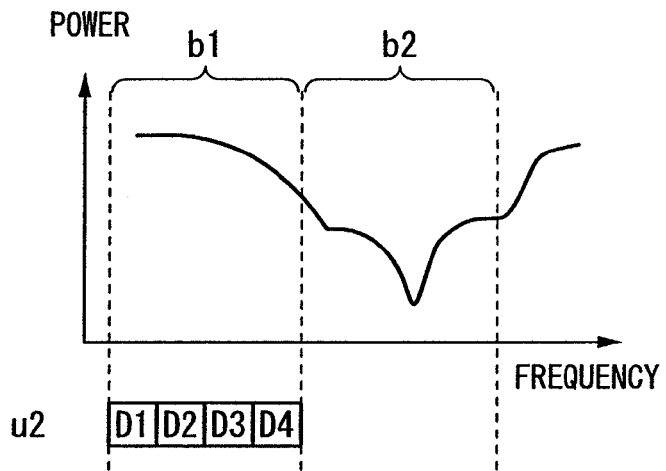
FIG. 3C is a diagram showing a transfer function of the first embodiment.

One the one hand, in order to obtain a multi-user diversity effect, preferably the maximum delay time 2T+dmax in the instantaneous delay profile is not particularly large. FIG. 3A, FIG. 3B, and FIG. 3C are diagrams showing the delay profile and transfer function of signals that reach a wireless receiver through a plurality of channels with different delay times. FIG. 3A shows a delay profile in terms of time (horizontal axis) and power (vertical axis) which represents the arrival of transmission signals at a wireless receiver through a plurality of (three) channels with different delay times. FIG. 3B shows the transfer function at the wireless receiver used by user u1. Moreover FIG. 3C shows the transfer function at the wireless receiver used by user u2. Because the wireless receivers of user u1 and user u2 are at different locations, the instantaneous transfer functions are different. In other words, deeming the regions on the left side of FIG. 3B and FIG. 3C frequency channel b1, and the regions on the right side frequency channel b2, user u1 obtains better quality in frequency channel b2, and user u2 obtains better quality in frequency channel b1. Accordingly, the data D1 to D4 are transmitted to user u1 over frequency channel b2. The data D1 to D4 are transmitted to user u2 over frequency channel b1.

In this manner, by utilizing the quality difference between frequency channels at a particular instant, a multi-user diversity effect that improves transmission efficiency can be obtained by having different users communicate over respective frequency channels. However, if the maximum delay time 2T+dmax is too large, the speed of variation in the transfer function due to frequency increases, which reduces the quality difference between the frequency channel 1 and the frequency channel 2. Accordingly, in order to obtain an adequate multi-user diversity effect, it is important that the maximum delay time 2T+dmax is small, as shown in FIG. 3A.

Figure 4A:
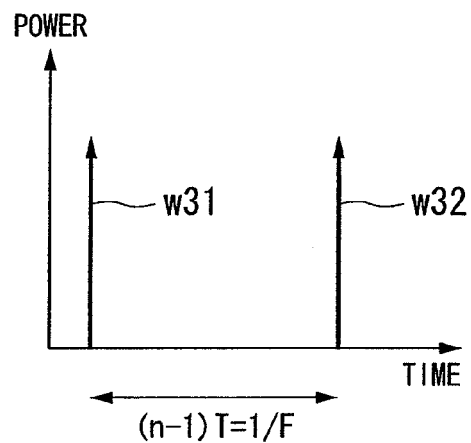
FIG. 4A is a diagram showing a delay profile of the first embodiment.
Figure 4B:
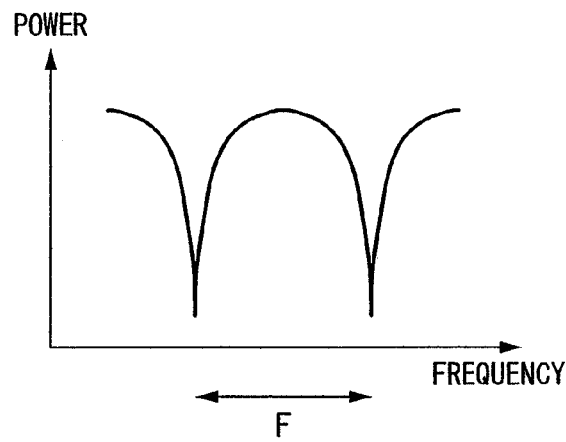
FIG. 4B is a diagram showing the frequency variation corresponding to the maximum delay time of FIG. 4A in the first embodiment.
Figure 5A:
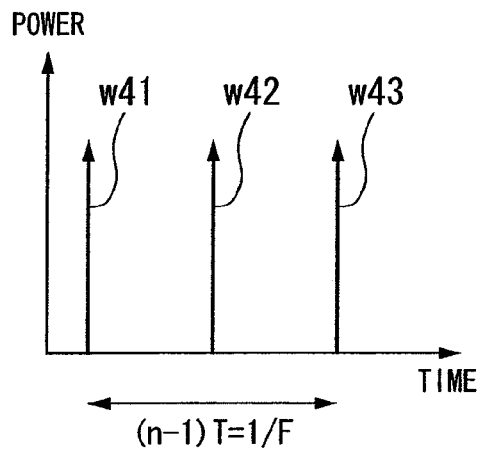
FIG. 5A is a diagram showing a delay profile of the first embodiment.
Figure 5B:
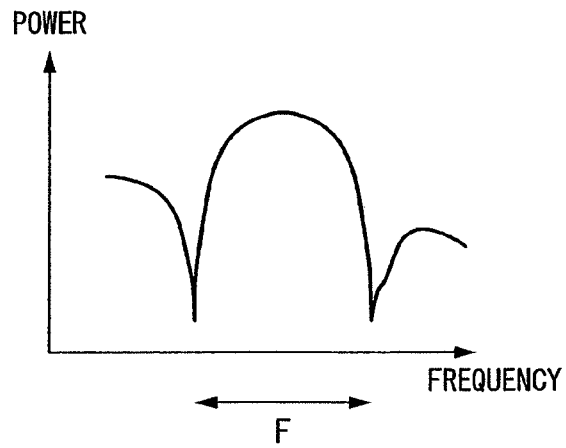
FIG. 5B is a diagram showing the frequency variation corresponding to the maximum delay time of FIG. 5A in the first embodiment.

FIG. 4A, FIG. 4B, FIG. 5A, and FIG. 5B are diagrams showing the relationship between the maximum delay time (n−1)T and frequency variation. As shown in FIG. 4A, when the difference between the arrival times of the two incoming waves w31 and w32 is (n−1)T, the transfer function of this channel is as shown in FIG. 4B. In other words, the interval between falls in the amplitude of the power (vertical axis) can be expressed as F=1/(n−1)T. Furthermore, as shown in FIG. 5A, when a plurality of delayed waves w41 to w42 exist, if the difference between the arrival times of the first incoming wave to arrive w41 and the last delayed wave to arrive w43 is (n−1)T, then as expected the frequency interval between falls in the amplitude of the power (vertical axis) is F=1/(n−1)T as shown in FIG. 5B.

Incidentally, as previously mentioned, because the appropriate variation in the transfer function due to frequency differs in cases where a frequency diversity effect is desired and in cases where a multi-user diversity effect is desired, then in the case where a frequency diversity effect is desired, by setting the maximum delay time (n−1)T between transmission antennas to (n−1)T>1/Fc, where Fc is the frequency bandwidth of a chunk which is a fundamental region defined in the frequency and time domains and is secured when users perform communication, an environment can be produced in which a frequency diversity effect can be readily obtained. In contrast, when a multi-user diversity effect is desired, by setting the maximum delay time (n−1)T between transmission antennas to (n−1)T<1/Fc, where Fc is the frequency bandwidth of a chunk, an environment can be produced in which a multi-user diversity effect can be readily obtained. Furthermore, in the description that follows, (n−1)T<1/Fc is taken to also include (n−1) T=0. Also in the description that follows, the delay time added to respective antennas is expressed as n−1 times T, and T is assumed to be constant, but different values of T may be used for the respective antennas. Moreover, when a multi-user diversity effect is desired, another way to reduce the maximum delay time, instead of using a setting of (n−1)T<1/Fc, is to reduce the number of transmission antennas used to transmit the signals.

As described above, by transmitting the transmission signals using frequency diversity or using multi-user diversity (by setting either (n−1)T>1/Fc or (n−1)T<1/Fc), a frequency diversity effect or a multi-user diversity effect can be obtained without being affected by the state of the channel.

Transmission using frequency diversity and transmission using multi-user diversity can be switched in accordance with such factors as the type of signal being transmitted (pilot signal, control signal, broadcast/multicast signal or the like) or the speed at which the wireless receiver is moving (frequency diversity when the receiver is traveling quickly and multi-user diversity when the receiver is traveling slowly).

FIG. 6A through FIG. 6C are explanatory drawings showing the transmission of the same signal from multiple antennas of a wireless transmitter 8 without the application of delay time. Considering a situation as shown in FIG. 6A where the wireless transmitter 8 includes a plurality of (three) horizontally omnidirectional transmission antennas arranged in parallel, because the elliptical lobes e11 and e12 shown in FIG. 6A are produced, receivers in certain directions such as wireless receiver 9 are able to receive the reception signal across the entire frequency band with a high reception level (refer to FIG. 6B), but receivers in other directions such as wireless receiver 10 receive the reception signal at a low reception level across the entire band (refer to FIG. 6C).

Figure 7A:
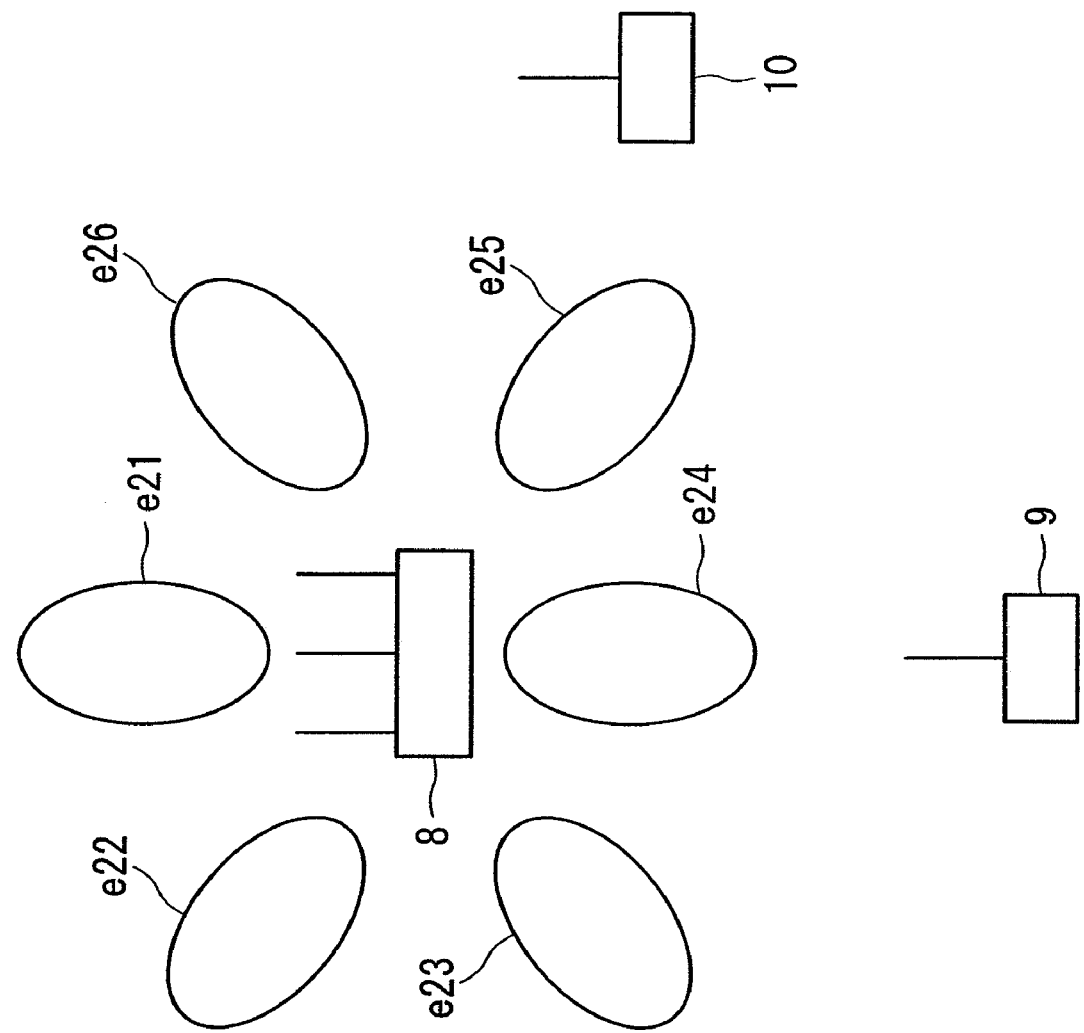
FIG. 7A is an explanatory drawing showing a situation where the same signal is transmitted from multiple antennas in the first embodiment with different delays added at respective antennas.
Figure 7B:
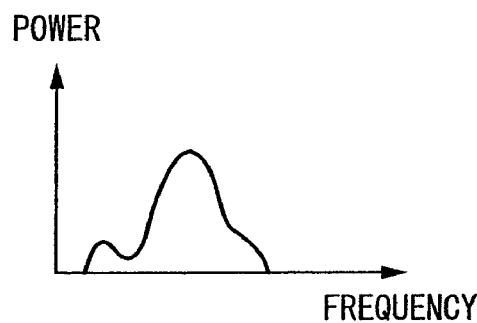
FIG. 7B is an explanatory drawing showing a situation where the same signal is transmitted from multiple antennas in the first embodiment with different delays added at each antenna.
Figure 7C:
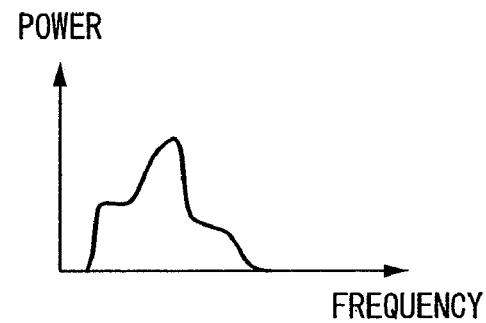
FIG. 7C is an explanatory drawing showing a situation where the same signal is transmitted from multiple antennas in the first embodiment with different delays added at respective antennas.

FIG. 7A through FIG. 7C are explanatory drawings showing the transmission of the same signal from multiple antennas of the wireless transmitter 8, with different delay times applied. Considering a situation as shown in FIG. 7A where the wireless transmitter 8 includes a plurality of (three) horizontally omnidirectional transmission antennas arranged in parallel, and assuming a narrow band, because the elliptical lobes e21 to e26 shown in FIG. 7A are produced, certain frequency bands in the received signal have high reception levels and other frequency bands have low reception levels, but the average level of the received signal is fairly constant regardless of direction. Consequently, in terms of the reception level of the signals at the wireless receiver 9 (refer to FIG. 7B) and at the wireless receiver 10 (refer to FIG. 7C), substantially the same quality is obtained at both receivers. Accordingly, the method of transmitting signals by applying different delay times at respective antennas of the wireless transmitter 8 can overcome the deficiencies associated with transmitting the same signal from each of multiple antennas as explained with reference to FIG. 6A to FIG. 6C.

Figure 8:
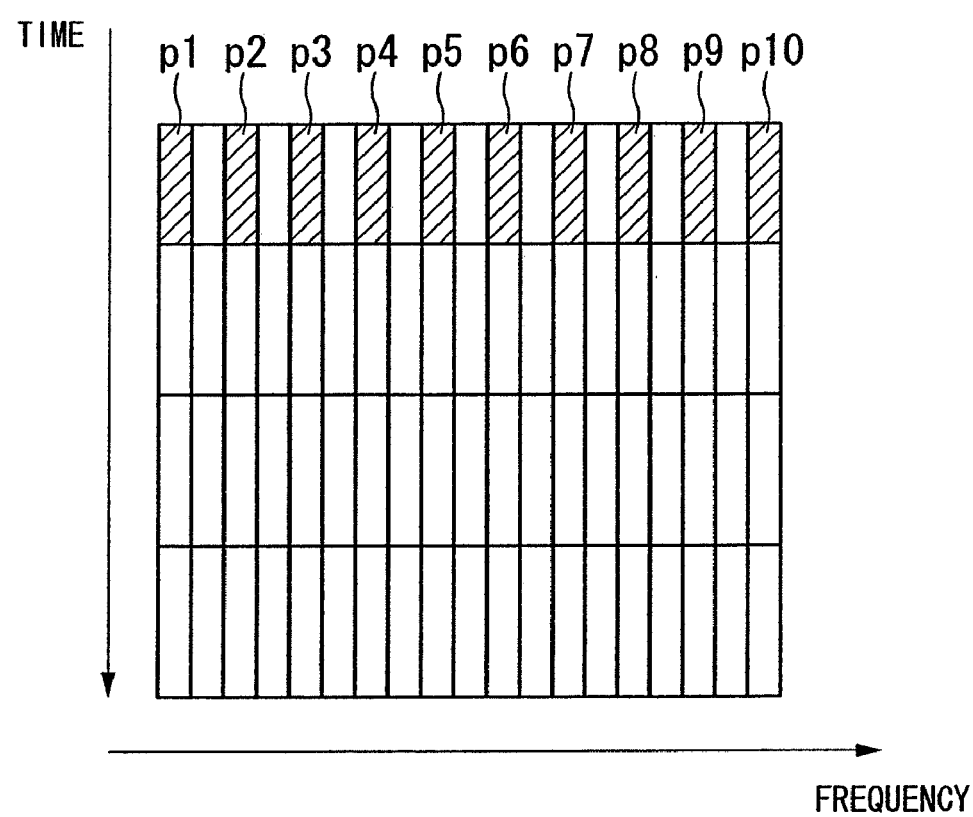
FIG. 8 is a diagram showing the signal structure within a chunk in the first embodiment.
Figure 31:
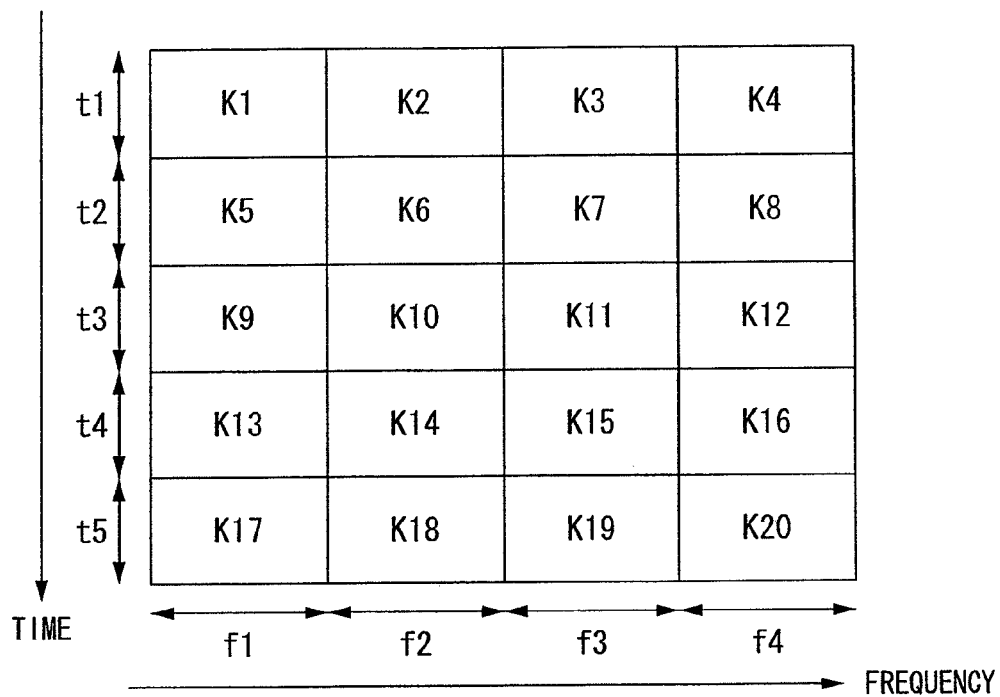
FIG. 31 is a diagram showing chunks in a signal transmitted from a wireless transmitter to a wireless receiver recited in the background art.
Figure 32:
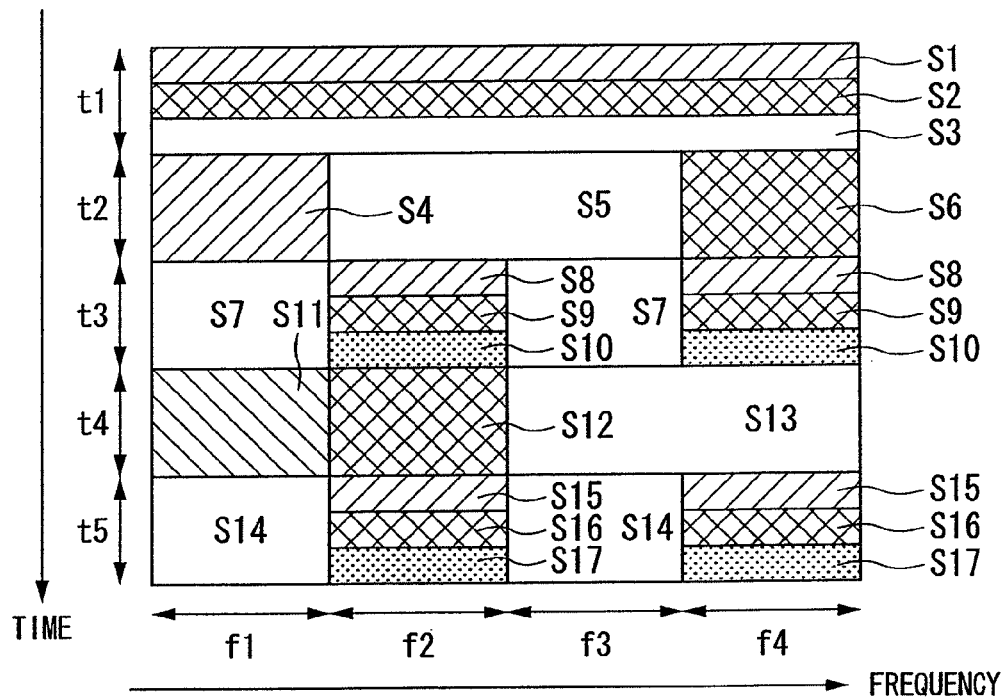
FIG. 32 is a diagram showing the allocated slots in a signal transmitted from a wireless transmitter to a wireless receiver in the background art.

FIG. 8 shows the signal structure within a chunk in the present embodiment. FIG. 8 shows the signal structure within the chunk K1 in FIG. 31 in detail. In this example, chunk K1 includes 19 subcarriers arranged in the frequency direction (horizontal axis direction) and four OFDM (Orthogonal Frequency Division Multiplexing) symbols arranged in the time direction (vertical axis). Furthermore, the shaded portions p1 to p10 in the figure constitute the Common Pilot Channel (CPICH), used to estimate the channel during demodulation and to measure aspects such as the quality of the received signal. The foregoing structure is the same for chunks K1 to K20. Furthermore in the description below, the common pilot channel and dedicated pilot channel are referred to collectively as the pilot channels (the pilot channels in the claims). Delay time is added to the data signal portion only, not to the pilot channels. Moreover, the dedicated pilot channel is added for the purpose of complementing the common pilot channel, and is used for such purposes as estimating channels during demodulation.

Moreover the non-shaded portions in FIG. 8 are subcarriers which are allocated to the data signals used to carry data channels and control channels.

Figure 9:
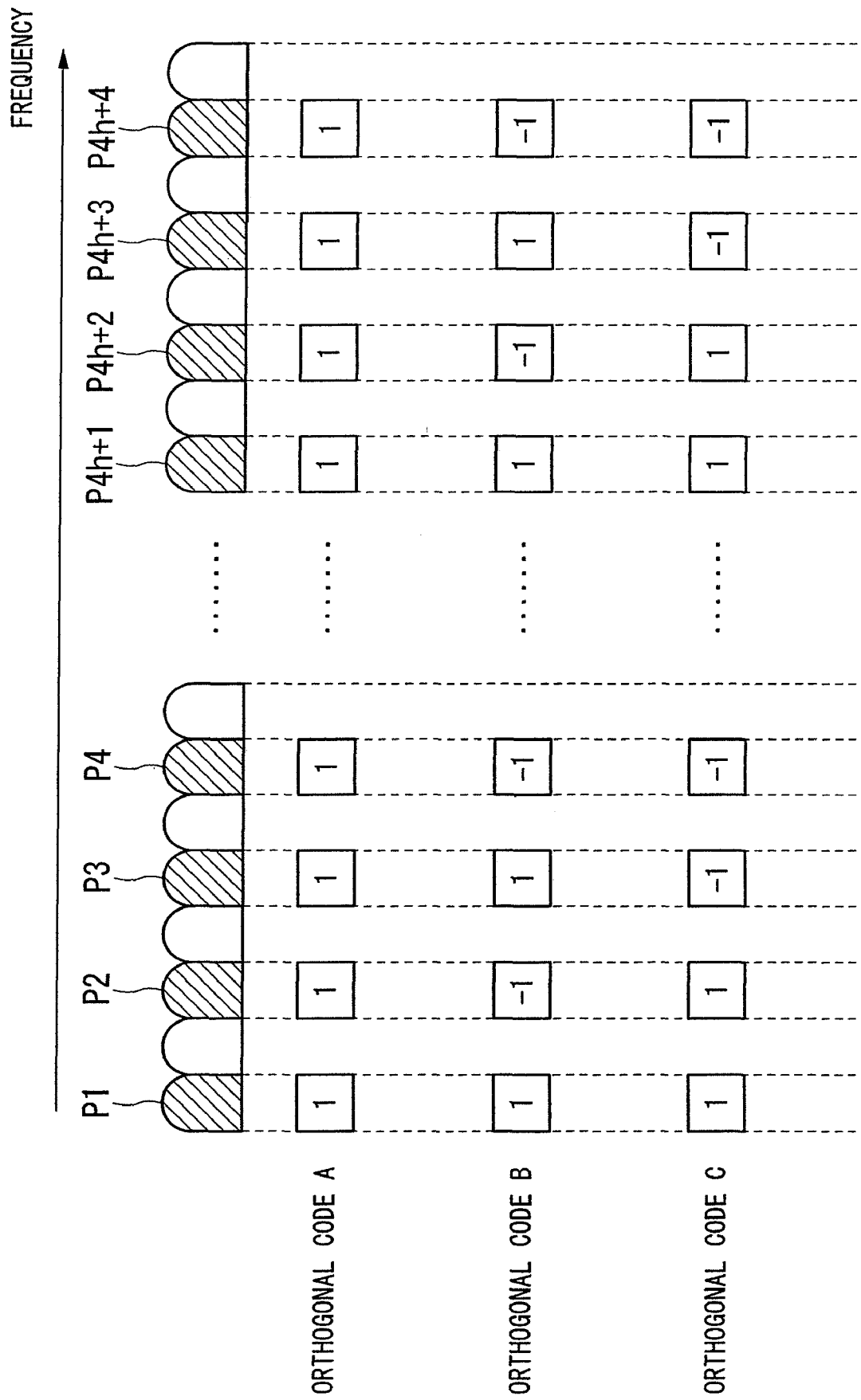
FIG. 9 is a diagram showing how orthogonal codes are allocated to pilot channels in the first embodiment.

Next, FIG. 9 shows an example where orthogonal codes A, B, and C are allocated to the common pilot channel shown in FIG. 8. The common pilot channel is a pilot channel that is received at all terminals. In FIG. 9, the horizontal axis represents frequency, and the curved shapes at the top of the figure indicate subcarriers.

The shaded subcarriers at the top of the figure correspond to the common pilot channel described in FIG. 8, and orthogonal codes A, B, and C are allocated to this common pilot channel. In FIG. 9, because the common pilot channel is allocated to every second subcarrier, the orthogonal codes are also allocated to every second subcarrier. In the present embodiment, the orthogonal codes (here orthogonal codes A, B, and C) are allocated, respectively, to the common pilot channel transmitted from each of the transmission antennas 2, 3, and 4 shown in FIG. 1 (hereinafter it is assumed that these antennas are allocated antenna number 1, 2, and 3 respectively). Consequently, for example if the common pilot channel transmitted from the transmission antenna 2 is multiplied by the orthogonal code A, then by multiplying the common pilot channels P1 to P4 by a complex conjugate of the orthogonal code A and adding the results, a transfer function that depicts the channel response in the frequency domain between the transmission antenna 2 and the reception antenna 11 can be determined even when the common pilot channels are transmitted concurrently from the other transmission antennas 3 and 4.

Furthermore, by repeating this process from common pilot channel P4h+1 to common pilot channel P4h+4 (where h is a natural number), the transfer function between the transmission antenna 2 (, the transmission antenna 3, or the transmission antenna 4) and the reception antenna 11 can be determined in the same manner.

Figure 10:
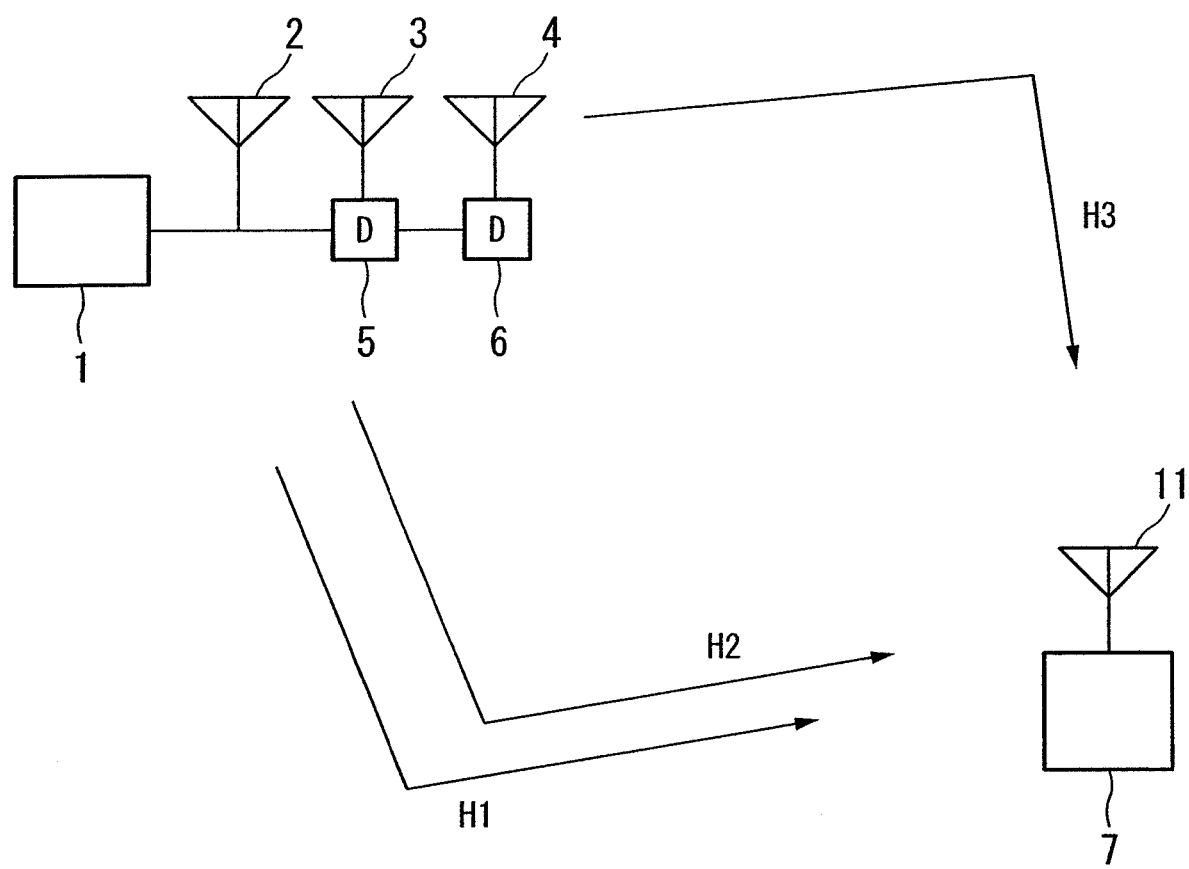
FIG. 10 is a schematic drawing showing how signals reach a wireless receiver from wireless transmitters in the first embodiment.

Next, FIG. 10 shows a simplified version of FIG. 1. The two are the same in that signals are transmitted from a transmitter 1 through three transmission antennas 2, 3, and 4 and received at a receiver 7, but differ in that the transfer function of the channel between the transmission antenna 2 and the reception antenna 11 is labeled H1, the transfer function between the transmission antenna 3 and the reception antenna 11 is labeled H2, and the transfer function between the transmission antenna 4 and the reception antenna 7 is labeled H3. Furthermore, as in FIG. 1, delay devices 5 and 6 add a delay of time T.

Although in practice the transmission signals transmitted from the transmitter 1 are presumed to reach the receiver 7 through a multi-path environment as shown in FIG. 1, here for the sake of simplicity a single path environment is depicted.

In the environment shown in FIG. 10, the transfer function of the combined waves of the transmission antennas 2 to 4 for the received signals that reach the receiver 7 from the transmitter 1 can be expressed as in FIG. 11, by taking into consideration the delay added by the delay devices 5 and 6 as well as the transfer functions H1 to H3. In FIG. 11, the horizontal axis is the real axis, and the vertical axis is the imaginary axis.

Here, assuming a delay of T is added to the transmission antenna 3 and a delay of 2T is added to the transmission antenna 4, the phase rotation amount θ in FIG. 11 corresponds to the delay amount T, and can be expressed as θ=2πm'T/Ts. Here m' is the subcarrier number of the middle subcarrier of the chunk used for communication between the transmitter 1 and the receiver 7 (for example chunk K1). Furthermore, Ts indicates the useful symbol duration of the OFDM symbol. Accordingly, because the value of θ can be calculated once the chunk used for communication and the delay time T for each transmission antenna are determined, by utilizing the properties of the orthogonal codes to calculate the transfer functions H1 to H3 between the transmission antennas 2 to 4 and the reception antenna 8, H1, $H2e^{j\theta}$, and $H3e^{j2\theta}$, which are the transfer functions after delay is added at each transmission antenna, and $H1+H2e^{j\theta}+H3e^{j2\theta}$, which is the transfer function after combining, can be calculated.

On the one hand, once the transfer functions H1, $H2e^{j\theta}$, and $H3e^{j2\theta}$ after delay is added at each transmission antenna can be calculated, then if, using for example H1 as a references, a vector of the transfer function after delay is added at each transmission antenna (here $H3e^{j2\theta}$) appears in a position opposite H1 over a dashed straight line which passes through the origin and is perpendicular to H1, then it can be understood that the transmission antenna 4 is working so as to weaken the received signals. Accordingly, by transmitting a signal from the base station with the phase inverted at the transmission antenna 4, the signal from the transmission antenna 4 can be utilized so as to enhance the received signals as shown in FIG. 12, giving the transfer function $H1+H2e^{j\theta}+H3e^{j(2\theta+\pi)}$ after combining a larger amplitude (improved reception quality) than in FIG. 11. Incidentally, applying the foregoing case to FIG. 3B, a situation where signals received from the respective transmission antennas weaken each other as in FIG. 11, leading to poor reception quality, corresponds to frequency channel b1 in FIG. 3B, and a situation where signals received from the respective transmission antennas strengthen each other, leading to good reception quality, corresponds to frequency channel b2 in FIG. 3B.

Thus, because the transfer functions H1, $H2e^{j\theta}$, and $H3e^{2j\theta}$ after delay is added at each transmission antenna can be measured only at the terminal apparatus, and phase control such as "inverting the phase of the transmission antenna 4" can be performed only at the base station, information about whether or not phase inversion is required for each antenna number is provided from the terminal apparatus to the base station in the form of a binary signal as shown in FIG. 13.

Figure 14:
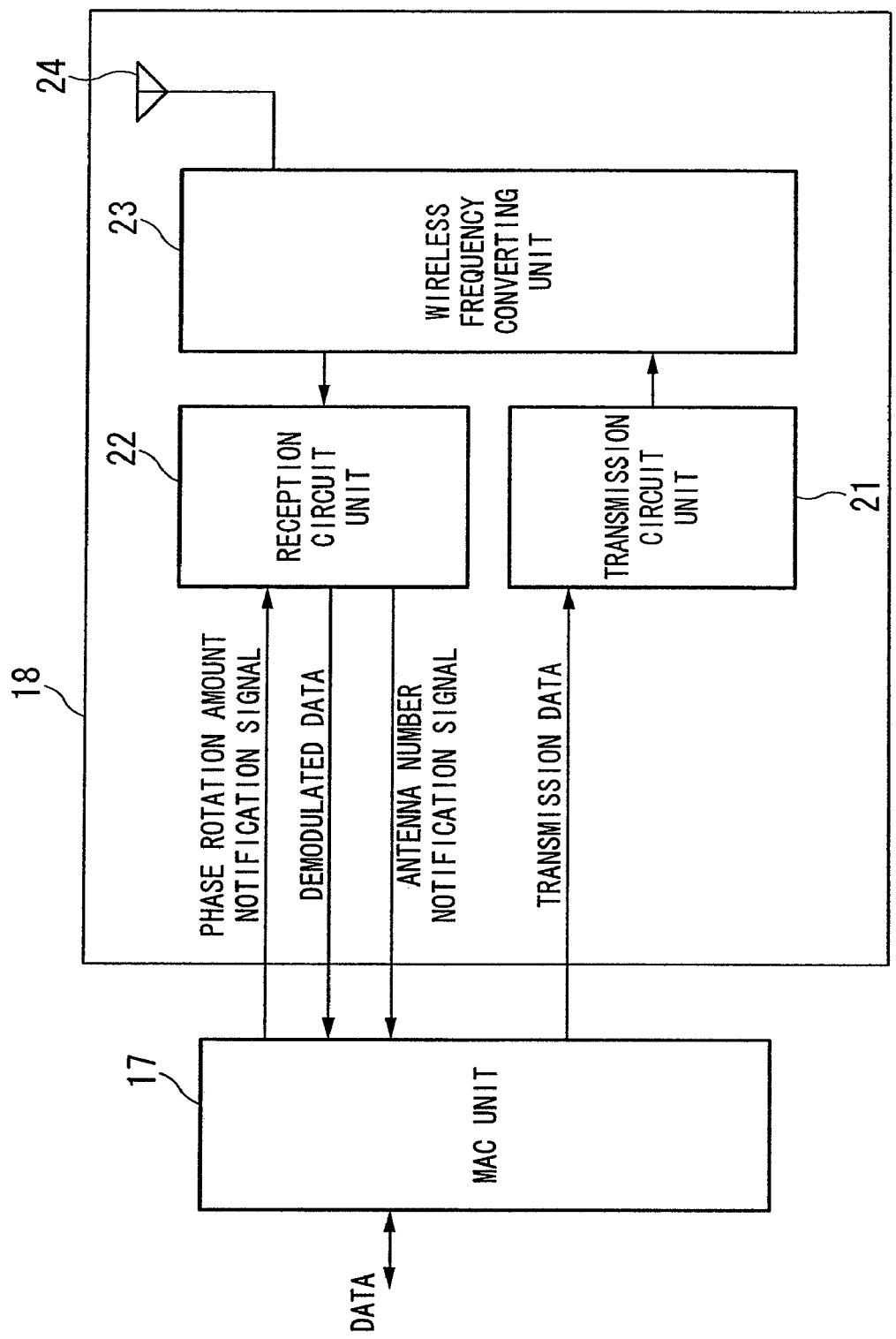
FIG. 14 is a diagram showing a terminal apparatus of the first embodiment.

The apparatus configuration of a terminal apparatus and base station apparatus that operate as above is described below. First, the apparatus configuration of the terminal apparatus is shown in FIG. 14. The terminal apparatus includes: a MAC (Media Access Control) unit 17 that performs ARQ (Automatic Repeat reQuest) processing, scheduling processing, and data assembly and disassembly, as well as controlling a physical layer unit 18, including transferring data received from a higher layer (not shown) to the physical layer unit 18 and transferring data transferred from the physical layer unit 18 to the higher layer (not shown); the physical layer unit 18 that, under the control of the MAC unit 17, converts the transmission data transferred from the MAC unit 17 into a wireless transmission signal, and passes received wireless signals to the MAC unit 17. Furthermore, the MAC unit 17 notifies a reception circuit unit 22 of the phase rotation amount θ shown in FIG. 11 and FIG. 12, and the reception circuit 22 notifies the MAC unit 17 of obtained information about whether or not phase inversion is required for each antenna number (FIG. 13) as an antenna number notification signal.

Furthermore, the physical layer unit 18 includes: a transmission circuit unit 21 that modulates the transmission data notified from the MAC unit 17 and transfers to a wireless frequency converting unit 23; the reception circuit unit 22 that demodulates the output from the wireless frequency converting unit 23 and passes to the MAC unit 17; the wireless frequency converting unit 23 that converts transmission signals passed from the transmission circuit unit 21 into a wireless frequency, and converts reception signals received by an antenna unit 24 into a frequency band able to be processed by the reception circuit unit 22; and the antenna unit 24 that transmits transmission signals passed from the frequency converting unit 23, and receives signals. The fundamental roles of these constituent elements, with the exception of the reception circuit unit 22, are described in the following reference documents (1) and (2).

(1) 3GPP contribution, R2-051738, "Evolution of Radio Interface Architecture", URL: ftp://ftp.3gpp.org/TSG_RAN/WG2_RL2/TSG2_AHs/2005_06_LTE/Docs/R2-051738.zip (2) 3GPP contribution, R1-050248, "Uplink Multiple Access Scheme for Evolved UTRA", URL: ftp://ftp.3gpp.org/TSG_RAN/WG1_RL1/TSGR1_40bis/Docs/R1-050248.zip Next, the reception circuit unit 22 is described with reference to FIG. 15. The reception circuit 22 includes: an A/D converting unit 33 that performs analog/digital conversion of the output of the wireless frequency converting unit 23 (FIG. 14); a GI removing unit 34 that removes a guard interval (GI) from the output of the A/D converting unit 33; an S/P converting unit 35 that performs serial/parallel conversion of the output of the GI removing unit 34; an FFT (Fast Fourier Transform) unit 36 that performs time/frequency conversion of the output of the S/P converting unit 35; a pilot channel extracting unit 37 that separates pilot channels from a data signal in the output of the FFT unit 36; antenna-specific channel estimating units 41-1 to 41-3 that use the pilot channels to derive the "transfer functions after delay is added at each transmission antenna" for the antennas numbered 1 to 3; an adding unit 44 that adds the outputs of the antenna-specific channel estimating units 41-1 to 41-3 for respective subcarriers; a switch unit 45 that switches between the output of the adding unit 44 and the output of a channel estimating unit 42 under the control of a control unit 46; a channel compensating unit 38 that applies channel compensation to a data signal using the output of the switch unit 45 as a channel estimation value; a demodulating unit 39 that performs demodulation processing such as QPSK (Quadrature Phase Shift Keying) or 16 QAM (Quadrature Amplitude Modulation) on the output of the channel compensating unit 38; and an error correction decoding unit 40 that performs error-correction decoding on the output of the demodulating unit 39.

Furthermore, the antenna-specific channel estimating unit 41-1 includes: the channel estimating unit 42 that calculates a channel estimation value for each transmission antenna based on the pilot channel signal extracted from the received signal by the pilot channel extracting unit 37; and a phase rotating unit 43 that multiplies the output of the channel estimating unit 42 by an amount of phase rotation θm corresponding to the delay for each transmission antenna. An inversion antenna selecting unit 47 uses the outputs of the phase rotating unit 43 to determine which transmission antennas are to be subjected to phase rotation by a predetermined phase amount as shown in FIG. 11 and FIG. 12 (here, the predetermined phase amount is π, which inverts the phase), and notifies the MAC unit 17 of the result as the antenna number notification signal. The MAC unit 17 outputs this antenna number notification signal to the transmission circuit unit 21 (FIG. 14) as transmission data, and the data is then transmitted via the wireless frequency converting unit 23 and the antenna unit 24.

The antenna-specific channel estimating units 41-2 and 41-3 have the same construction as the antenna-specific channel estimating unit 41-1. Furthermore, a situation in which the switch unit 45 uses the output of the channel estimating unit 42 as the channel estimation value corresponds to (for example) when a data signal is only transmitted from the transmission antenna allocated antenna number 1 (no transmission diversity is performed), and a situation in which the switch unit 45 uses the output of the adding unit 44 as the channel estimation value corresponds to (for example) when CDTD (Cyclic Delay Transmit Diversity) is performed. The value θm above is defined as $\theta m = 2\pi m(n-1)T/Ts$, where m is the subcarrier number, Ts is the useful symbol duration of the OFDM symbol, and $(n-1)T$ is the delay time applied to the transmission antenna allocated antenna number n.

Furthermore, delay is added only to the data signal portion, not to the pilot channel.

Figure 15:
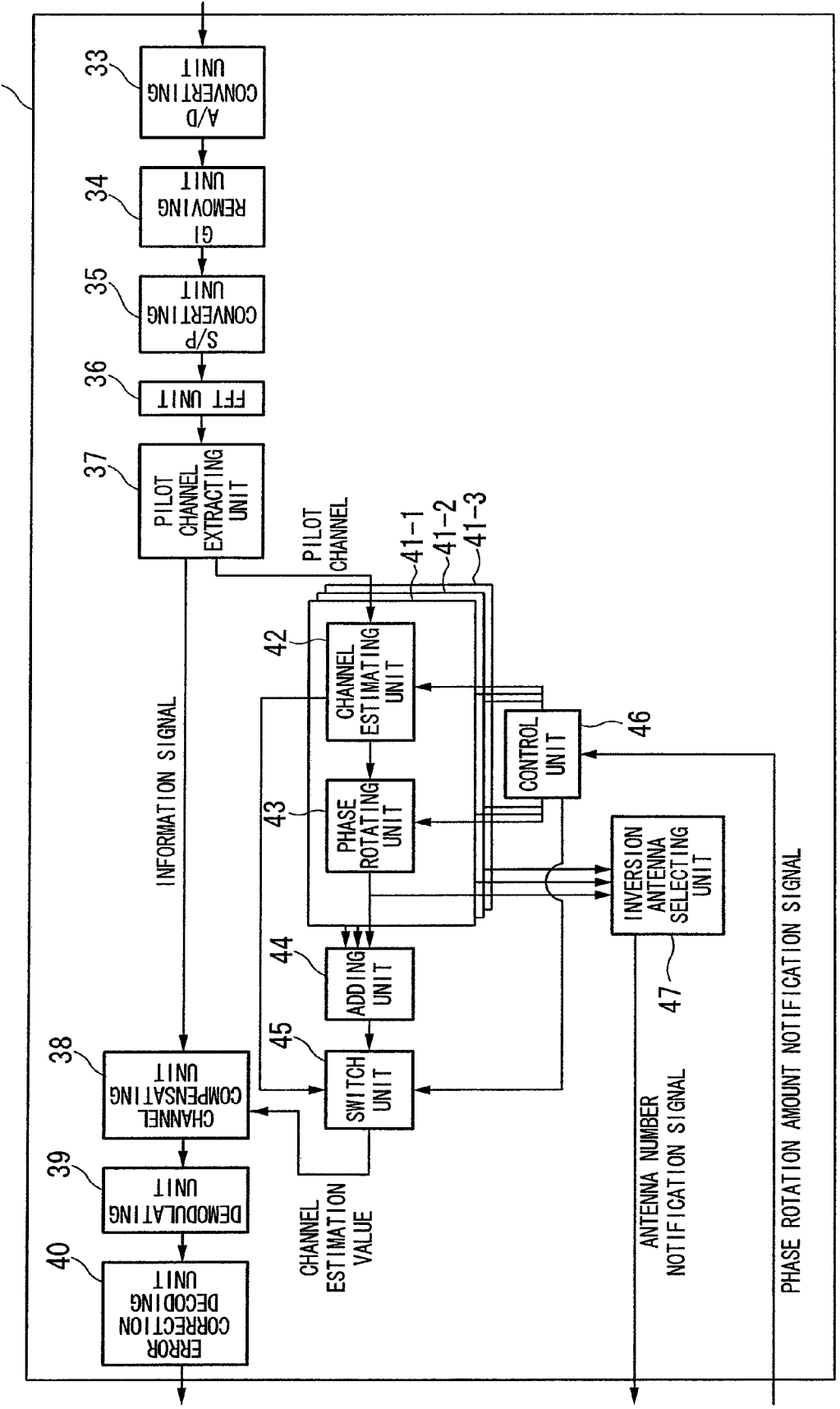
FIG. 15 is a diagram showing a receiver circuit unit included in the terminal apparatus of the first embodiment.
Figure 16:
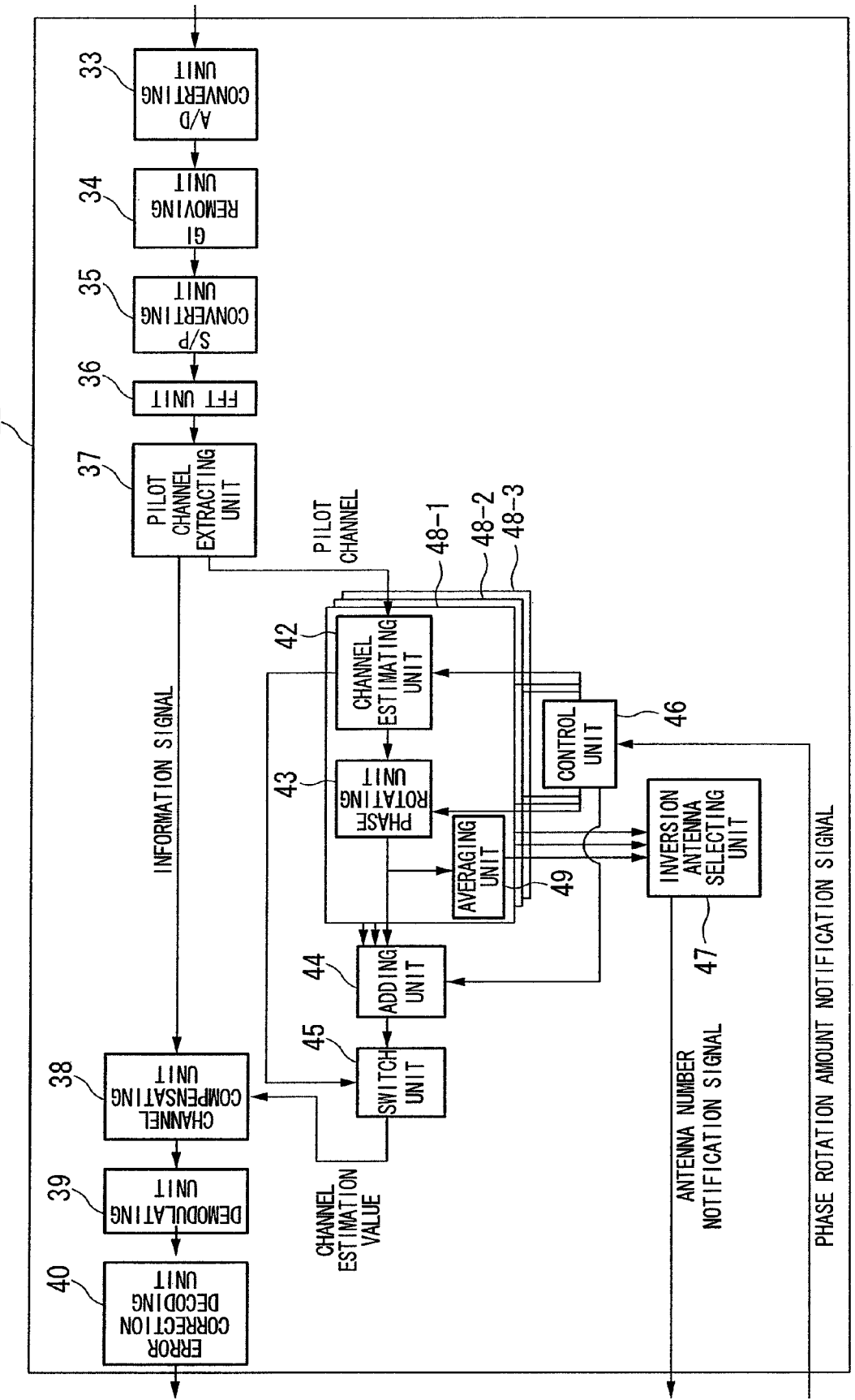
FIG. 16 is a diagram showing the receiver circuit unit included in the terminal apparatus of the first embodiment.

On the one hand, the reception circuit unit 22 shown in FIG. 16 has substantially the same construction as that shown in FIG. 15, with the exception that the antenna-specific channel estimating unit 48-1 has an averaging unit 49. In FIG. 15, the inversion antenna selecting unit 47 uses the middle subcarrier of the chunk used for communication by the transmitter 1 and receiver 7 (for example chunk K1) as shown in FIG. 11 and FIG. 12, but in FIG. 16, the averaging unit 49 is provided that averages the outputs for multiple subcarriers from the phase rotating unit 43 calculated from the pilot channels in the chunk, and the inversion antenna selecting unit 47 uses the output of the averaging unit 49, and thus antennas can be selected using the average transfer function within the chunk.

Figure 17:
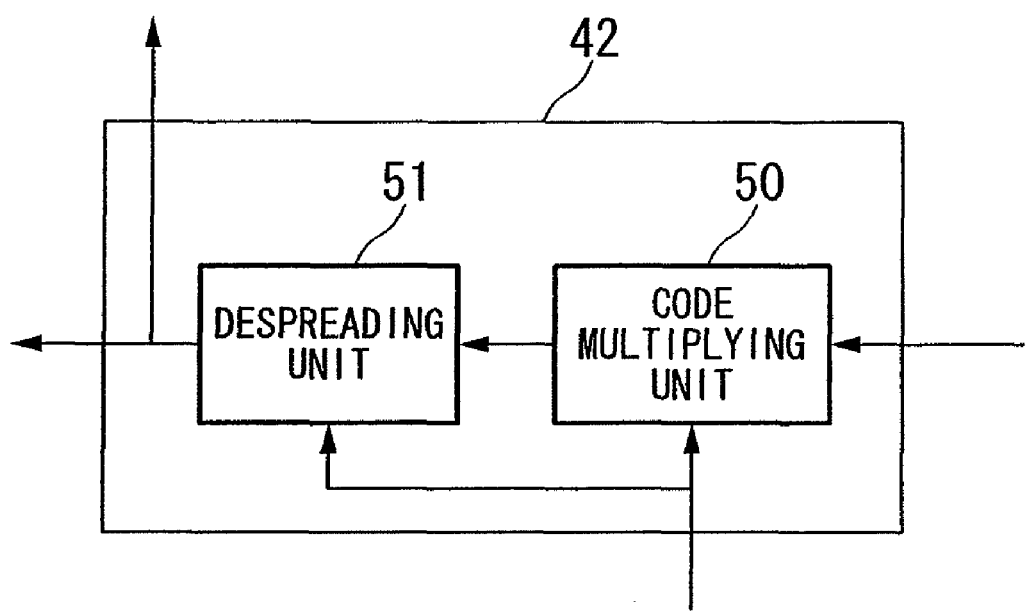
FIG. 17 is a diagram showing a channel estimating unit included in the terminal apparatus of the first embodiment.

Furthermore, FIG. 17 shows the channel estimating unit 42 of FIG. 15 and FIG. 16 in detail. As shown in the figure, the input to the channel estimating unit 42 enters a code multiplying unit 50. To determine the transfer function from the transmission antenna 2 allocated, for example, antenna number 1, the input signal is multiplied by a complex conjugate of code A (refer to FIG. 9) in the code multiplying unit 50, and then added in a despreading unit 51 over the period of the orthogonal code (in the case of code A in FIG. 9, adding for 4 pilot channels). Accordingly, the channel estimating unit 42 output can determine the transfer function of the channel from the desired antenna. Information about the orthogonal code and period thereof is notified from the control unit 46.

Figure 18:
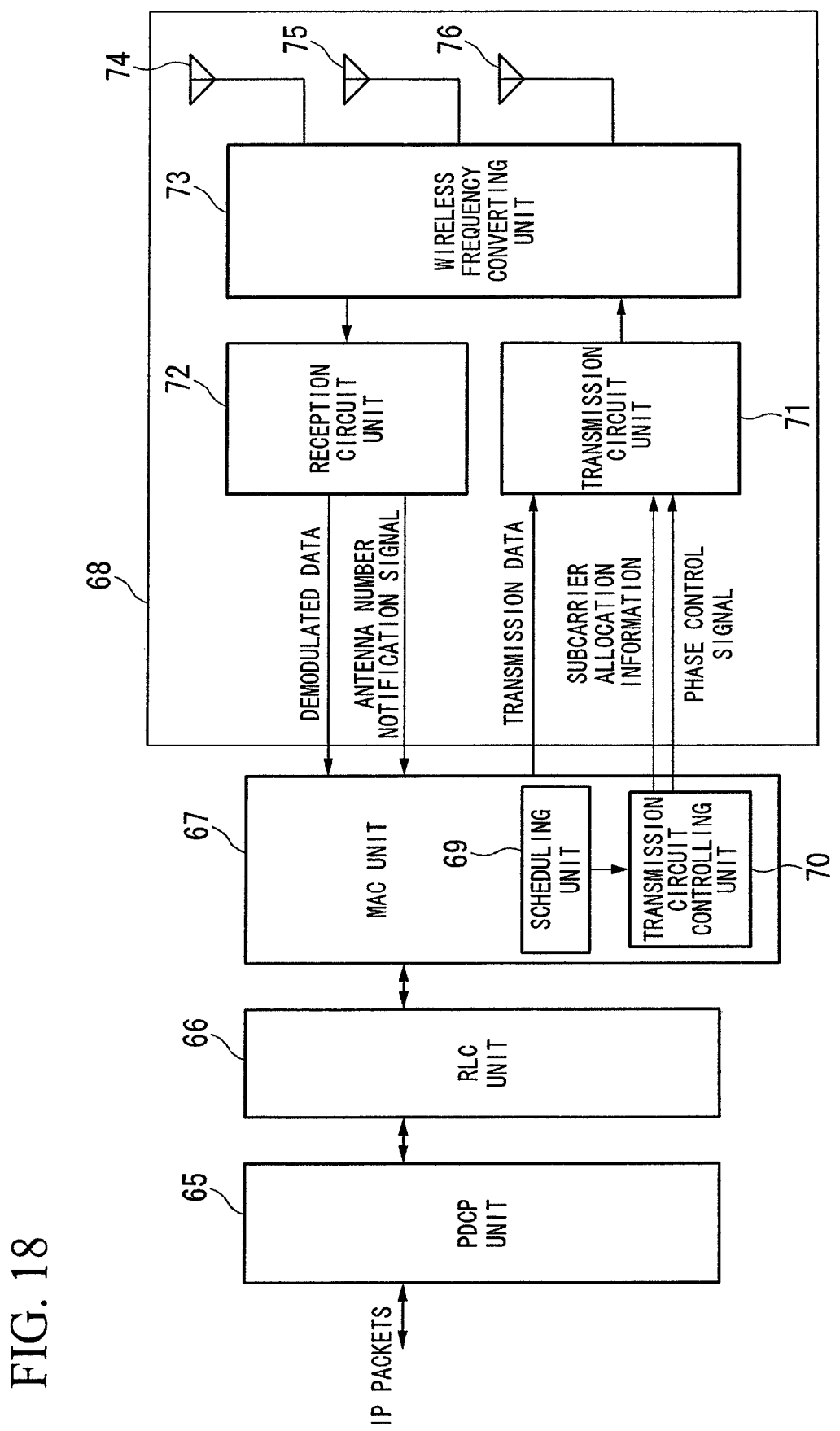
FIG. 18 is a diagram showing a base station apparatus of the first embodiment.

Next, FIG. 18 shows the construction of the base station apparatus. The base station apparatus includes: a PDCP (Packet Data Convergence Protocol) unit 65 that receives IP packets, performs such processing as compressing headers thereof, transfers to an RLC (Radio Link Control) unit 66, and decompresses the headers so as to convert data received from the RLC unit 66 into IP packets; the RLC (Radio Link Control) unit 66 that transfers data received from the PDCP unit 65 to a MAC (Media Access Control) unit 67 and also transfers data transferred from the MAC unit 67 to the PDCP unit 65; the MAC (Media Access Control) unit 67 that performs ARQ processing, scheduling processing, and data assembly and disassembly, as well as controlling a physical layer unit 68, transferring data transferred from the RLC unit 66 to the physical layer unit 68 and transferring data transferred from the physical layer unit 68 to the RLC unit 66; and the physical layer unit 68 that, under the control of the MAC unit 67, converts transmission data transferred from the MAC unit 67 into wireless transmission signals, and transfers wireless reception signals to the MAC unit 67.

Furthermore, the MAC unit 67 includes: a scheduling unit 69 that determines the allocated slots to use to communicate with each terminal communicating with the base station apparatus; and a transmission circuit controlling unit 70 that controls the transmission circuit unit 71 using "subcarrier allocation information" based on "chunk allocation information" received from the scheduling unit 69, and uses a phase control signal to control the delay time between the antennas depending on a frequency diversity region or multi-user diversity region, as shown in FIG. 2 and FIG. 3. In addition, in the MAC unit 67, the transmission circuit controlling unit 70 uses the antenna number notification signal, which is notified from the reception circuit 72 based on the received signal, to control the transmission circuit 71 through the phase control signal.

Furthermore, the physical layer unit 68 includes: the transmission circuit unit 71 that performs modulation of data notified from the MAC unit 67 under the control of the transmission circuit controlling unit 70 and notifies the wireless frequency converting unit 73; the reception circuit unit 72 that demodulates the output of the wireless frequency converting unit 73 and passes to the MAC unit 67; the frequency converting unit 73 that converts transmission signals passed from the transmission circuit unit 71 into a wireless frequency, and converts reception signals received by antenna units 74 to 76 into a frequency band able to be processed by the reception circuit unit 72; and the antenna units 74 to 76 that transmit transmission signals passed from the frequency converting unit 73 into wireless space and receive signals from the wireless space. With the exception of the transmission circuit unit 71, which is a feature of the present invention, the details of the roles of these constituent elements are described in reference documents (1) and (2) mentioned above, and detailed description thereof is omitted here.

Figure 19:
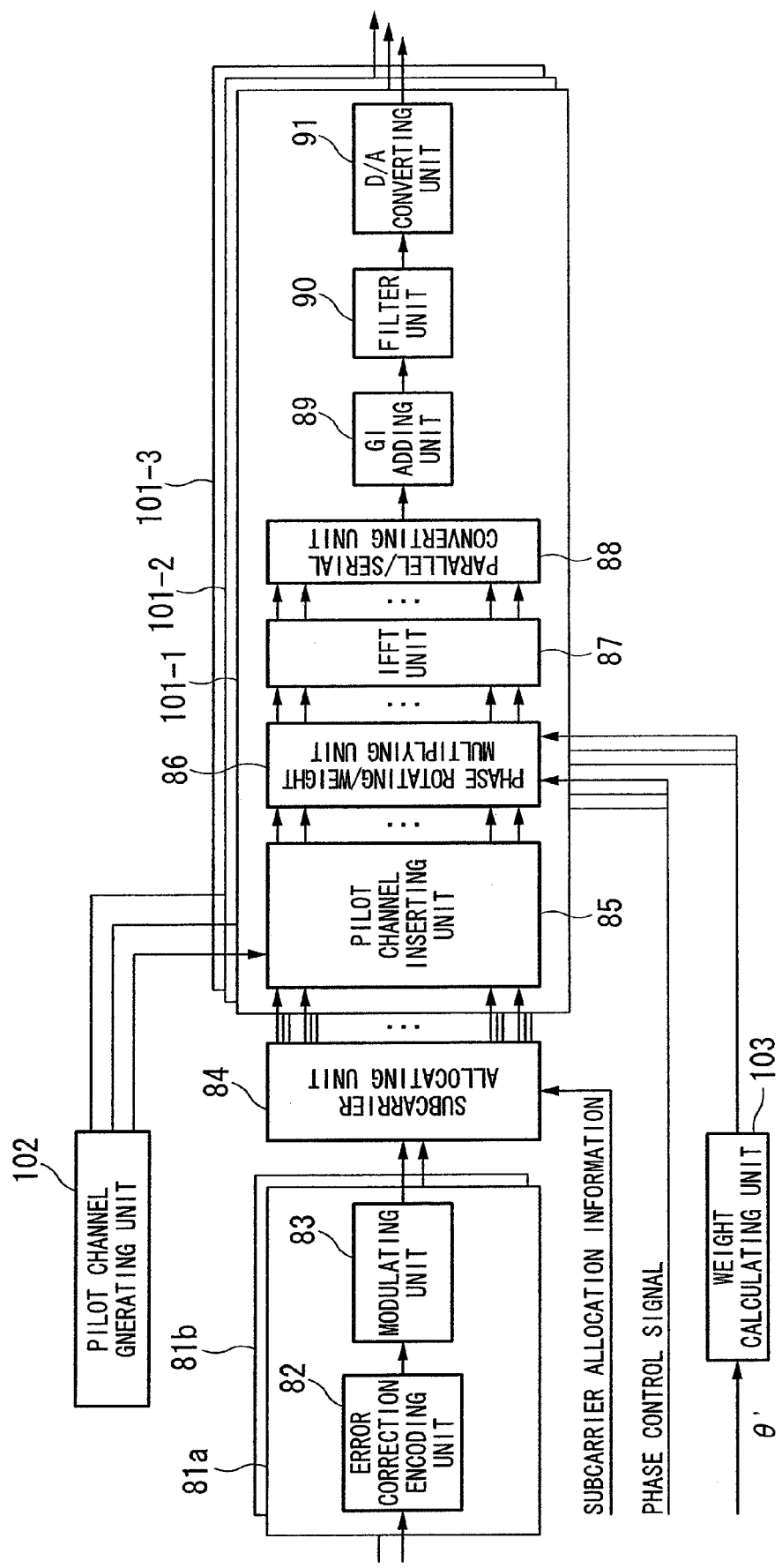
FIG. 19 is a diagram showing a transmission circuit unit included in the base station apparatus of the first embodiment.

Next, FIG. 19 shows the construction of the transmission circuit unit 71 in the present embodiment. As shown in FIG. 19, the transmission circuit unit 71 includes: user-specific signal processing units 81*a* and 81*b* that process signals destined for respective users; a pilot signal generating unit 102 that generates pilot channel signals which are used, for example, for channel estimation in the terminals, orthogonal codes which are orthogonal with each other being allocated to the respective antennas, and inputs them into a pilot channel inserting unit 85; a subcarrier allocating unit 84 that allocates the outputs of the user-specific signal processing units 81*a* and 81*b* to respective subcarriers; and antenna-specific signal processing units 101-1, 101-2, and 101-3 that process the signals for the respective antennas.

The user-specific signal processing unit 81*a* includes an error correction encoding unit 82 that performs error-correction encoding of transmission data, and a modulating unit 83 that performs modulation processing such as QPSK or 16 QAM on the output of the error correction encoding unit. The outputs from the user-specific signal processing units 81*a* and 81*b* are allocated to suitable subcarriers in the subcarrier allocating unit 84 which allocates to suitable subcarriers based on the "subcarrier allocation information" notified from the transmission circuit controlling unit 70 (refer to FIG. 18), and are then output to the antenna-specific signal processing units 101-1 to 101-3. In the antenna-specific signal processing unit 101-1, the pilot channel inserting unit 85 allocates the output of the pilot channel generating unit 102 to the positions (subcarriers) for the common pilot channels as shown in FIG. 8, based on the outputs of the subcarrier allocating unit 84 and the output of the pilot channel generating unit 102.

Furthermore, the outputs of the pilot channel inserting unit 85 are input into a phase rotating/weight multiplying unit 86, in which a phase rotation θm or weight wm is multiplied for respective subcarriers, and the result is output to an IFFT (Inverse Fast Fourier Transport: inverse fast Fourier converting unit) unit 87. Then, the output of the IFFT unit 87 is subjected to parallel-to-serial conversion in a parallel/serial converting unit 88, and a guard interval is added to the output of the parallel/serial converting unit 88 by a GI adding unit 89.

In addition, a filter unit 90 extracts only a signal of a desired bandwidth in the output of the GI adding unit 89, and a D/A converting unit 91 performs digital/analog conversion of the output of the filter unit 90 and outputs. This output serves as the output of the antenna-specific signal processing unit 101-1.

Furthermore, the antenna-specific signal processing units 101-2 and 101-3 have a similar construction. The outputs of the antenna-specific signal processing units 101-1, 101-2, and 101-3 each pass through the wireless frequency converting unit 73 (refer to FIG. 18) which performs frequency-conversion into a wireless frequency and then output to the antennas 74, 75, and 76 (refer to FIG. 18) for transmission as a wireless signal. When phase rotation is added by the phase rotating/weight multiplying unit 86, the phase rotation is θm, which is notified from the transmission circuit controlling unit 70 as the phase control signal based on the antenna number notification signal included in the reception signal received by the base station apparatus. The details thereof will be described below. Furthermore, when multiplication by a weight wm takes place in the phase rotating/weight multiplying unit 86, directivity control can be performed by setting the weight in the manner shown below.

Assuming a linear array of n antennas where the element separation is a half wavelength of the carrier frequency, an example of the weight wm can be expressed as follows:

$$w_m = \frac{1}{\sqrt{n}} \left\{ \begin{array}{c} e^{jk\pi\sin\theta'(0-\frac{n-1}{2})}, e^{jk\pi\sin\theta'(1-\frac{n-1}{2})}, \ldots, \\ e^{jk\pi\sin\theta'((n-1)-\frac{n-1}{2})} \end{array} \right\}$$ [Equation 1]

Here, wm is the weight used by the weight multiplying circuit expressed as a vector, where the first element corresponds to the weight used for antenna number 1, the second element corresponds to the weight used for antenna number 2, and the nth element corresponds to the weight used for antenna number n, and so on. In the wm given above, n is the number of antennas (n=3 in the present embodiment), θ' is the direction of the main beam, and k is the ratio between the frequency at which the signal is to be transmitted and the frequency at which θ' was measured.

Here, as the direction θ' of the main beam, a value measured by a receiver or the terminal of the other party of communication is notified to a weight calculating unit 310 and used when deriving the weight wm. The wm given above is only one example, and a method of deriving θ' and wm is proposed in detail in the following reference document:

"IEICE Technical Report RCS2004-229", published November 2004 by the Institute of Electronics, Information, and Communication Engineers In FIG. 19, a situation involving two users and three antennas was described, but naturally a similar construction can be employed for other situations.

Subsequently, FIG. 20 relates to the phase control signal. As shown in FIG. 20, in phase control, different phase rotation is applied for respective antennas (antenna numbers 1, 2, and 3), respective subcarriers (subcarrier m), against the pilot channel and the data signal, and for respective chunks (or allocated slots) used for communication (the delay amount T differs as shown in FIG. 2 and FIG. 3). In concrete terms, in the present embodiment, no delay amount is added to the pilot channel at any antenna, and no delay amount is added to the antenna designated antenna number 1. Regarding the delay time, a delay time of T is added at antenna number 2 to the data signal portion only, and a delay time of 2T is added at antenna number 3. In addition, regarding the phase inversion based on the antenna number notification signal notified from the terminal, in this case antenna number 3 is notified as shown in FIG. 13, and the phase inversion is performed for the antenna designated antenna number 3.

In this case, regarding the phase rotation amount θm of the phase control signal, the phase rotation amount θm is always 0 for the pilot channel regardless of the antennas, and for the data signal portion, it is 0 for antenna number 1, $2\pi mT/Ts$ for antenna number 2, and $2\pi m2T/Ts+\pi$ for antenna number 3. In the phase rotating/weight multiplying unit 86, phase rotation is implemented based on the phase control signal. If the antenna number notification signal notified from the terminal indicates an antenna other than antenna number 3, the phase of that antenna is controlled by adding π. Here T is the delay time between antenna number 1 and antenna number 2, and can be a different value for respective chunks (or allocated slots) used for communication. Moreover, m is the subcarrier number, and Ts is the useful symbol duration of the OFDM symbol.

Figure 22:
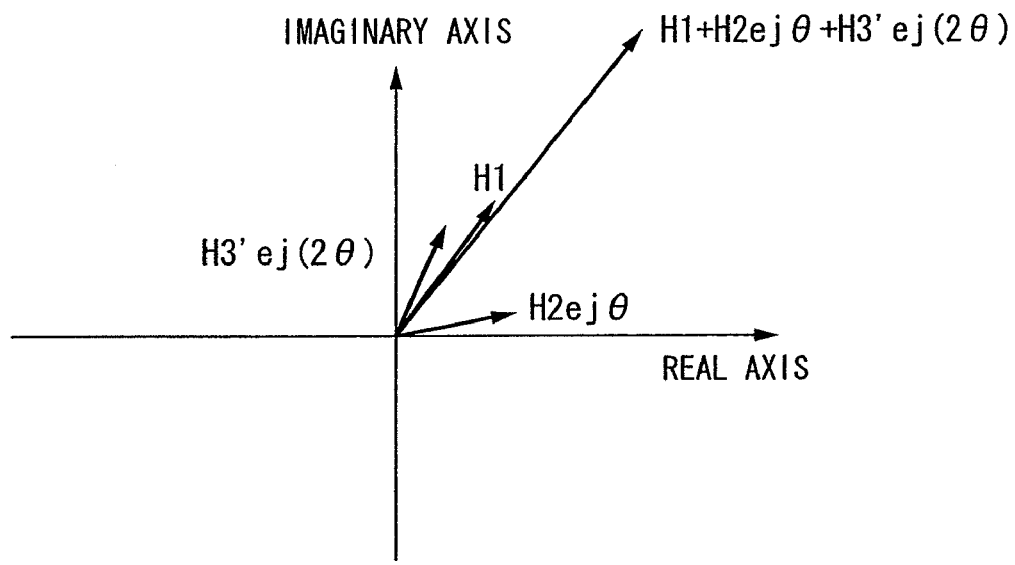
FIG. 22 is a diagram showing the transfer function between respective transmission antennas and a reception antenna, and the transfer function of the combined wave thereof in the first embodiment.

A different case in which the phase control information shown in FIG. 21 is used is described in the same manner. The phase control information in FIG. 21 is substantially the same as that in FIG. 20, with the exception of the phase control information related to the pilot channel of antenna number 3. In this case, the phase inversion operation is performed in the phase rotating/weight multiplying unit 86 on not only the data signal but also the pilot channel of the antenna whose antenna number is included in the antenna number notification signal notified from the terminal, and the use of such phase control information distinguishes FIG. 21 from FIG. 20. Furthermore, in this case, the phase rotation amount added in the phase rotating unit included in the antenna-specific channel estimating unit 41-3 on the terminal apparatus side in FIG. 15 also differs from FIG. 12, and because the state after phase rotation of π is added to the pilot channel is observed (H3'), only the phase rotation 2θ corresponding to the delay time added to each antenna is added at the phase rotating unit 43 and used in the demodulation as channel estimation information (refer to FIG. 22).

Thus, by using a communication system including the terminal apparatus and the base station apparatus set forth in the present embodiment, even when the maximum delay time between antennas is small particularly as shown in FIG. 3A, a large multi-user diversity effect can be obtained by performing the phase control described in the present embodiment. In the present embodiment, an example was used in which the phase of each antenna is inverted, that is, the phases are changed by π, but this is not limited to π, and a variety of values such as π/4 and π/3 can be used to achieve similar techniques, although a detailed description thereof is omitted here.

Second Embodiment

Figure 23:
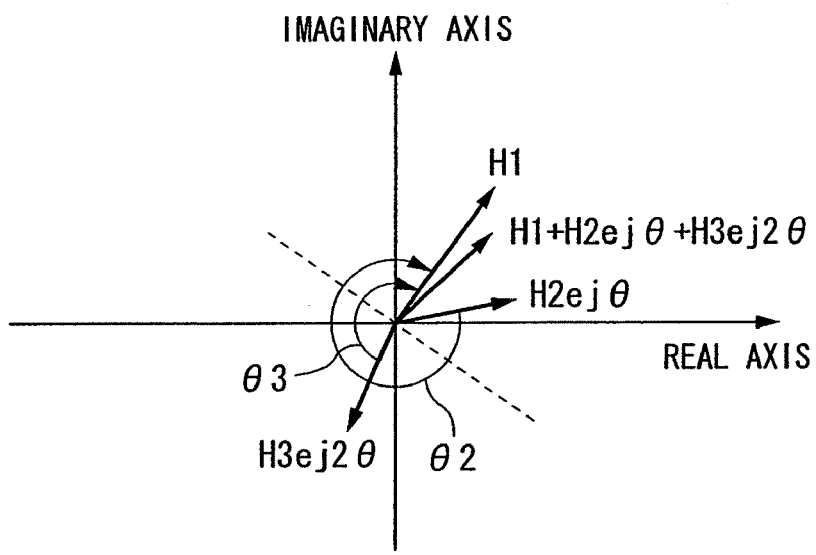
FIG. 23 is a diagram showing the transfer function between respective transmission antennas and a reception antenna, and the transfer function of the combined wave thereof in a second embodiment of this invention.

In the present embodiment, a system is described in which the phase rotation amount for each antenna is measured in the terminal and is notified to the base station. FIG. 23 is substantially the same as FIG. 10, except that by adding the phase rotation amount required to align the phases at H1, that is, adding phase rotation amount of θ2 to the signal H2$e^{j\theta}$ from the antenna designated antenna number 2 (in this case transmission antenna 3) and phase rotation amount of θ3 to the signal H3$e^{2j\theta}$ from the antenna designated antenna number 3 (in this case transmission antenna 4), the received signals from the three transmission antennas can be added in an in-phase and received at the terminal.

Figures 24, 25:
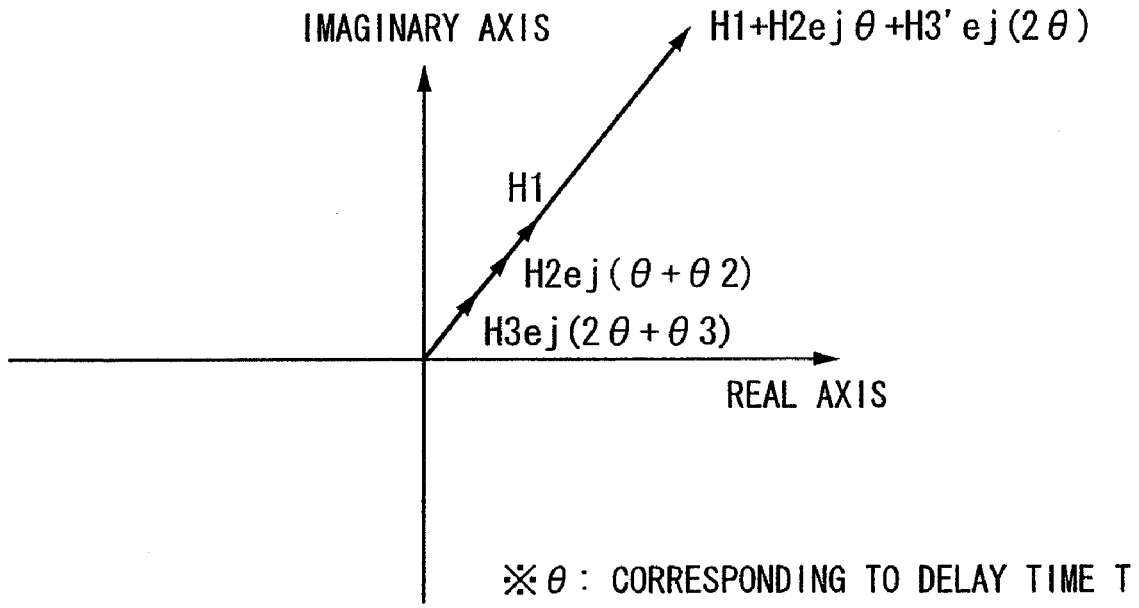
FIG. 24 is a diagram showing the transfer function between respective transmission antennas and a reception antenna, and the transfer function of the combined wave thereof in the second embodiment.
FIG. 25 is a diagram showing the antenna number/phase rotation amount notification signal that is notified from the terminal apparatus to the base station apparatus in the second embodiment.

This situation is shown in FIG. 24. That is, the transfer functions of respective antennas after delay is added are H1, H2$e^{j\theta}$, and H3$e^{j2\theta}$. Although the combined transfer function thereof is H1+H2$e^{j\theta}$+H3$e^{j2\theta}$, it can be understood that by adding phase rotation of θ2 to the antenna designated antenna number 2 (transmission antenna 3) and phase rotation of θ3 to the antenna designated antenna number 3 (transmission antenna 4) beforehand at the base station, the resulting transfer functions after phase rotation is performed and delay is added at respective antennas are H1, H2$e^{j(\theta+\theta2)}$, and H3$e^{j(2\theta+\theta3)}$, and the amplitude of the combined transfer function H1+H2$e^{j(\theta+\theta2)}$+H3$e^{j(2\theta+\theta3)}$ thereof is larger than that of FIG. 23. Incidentally, applying the above case to FIG. 3B, a situation as in FIG. 11 where signals received from the respective transmission antennas weaken each other, leading to poor reception quality, corresponds to frequency channel b1 in FIG. 3B, and a situation as in FIG. 12 where signals received from the respective transmission antennas strengthen each other, leading to good reception quality, corresponds to frequency channel b2 of FIG. 3B.

In this manner, because the transfer functions H1, H2$e^{j\theta}$, and H3$e^{j2\theta}$ after delay is added at each antenna can be measured only at the terminal apparatus, and phase control per antenna such as θ2 and θ3 can be performed only at the base station apparatus, the terminal apparatus must notify the base station apparatus of the phase rotation amounts for respective antenna numbers as shown in FIG. 25.

Figure 26:
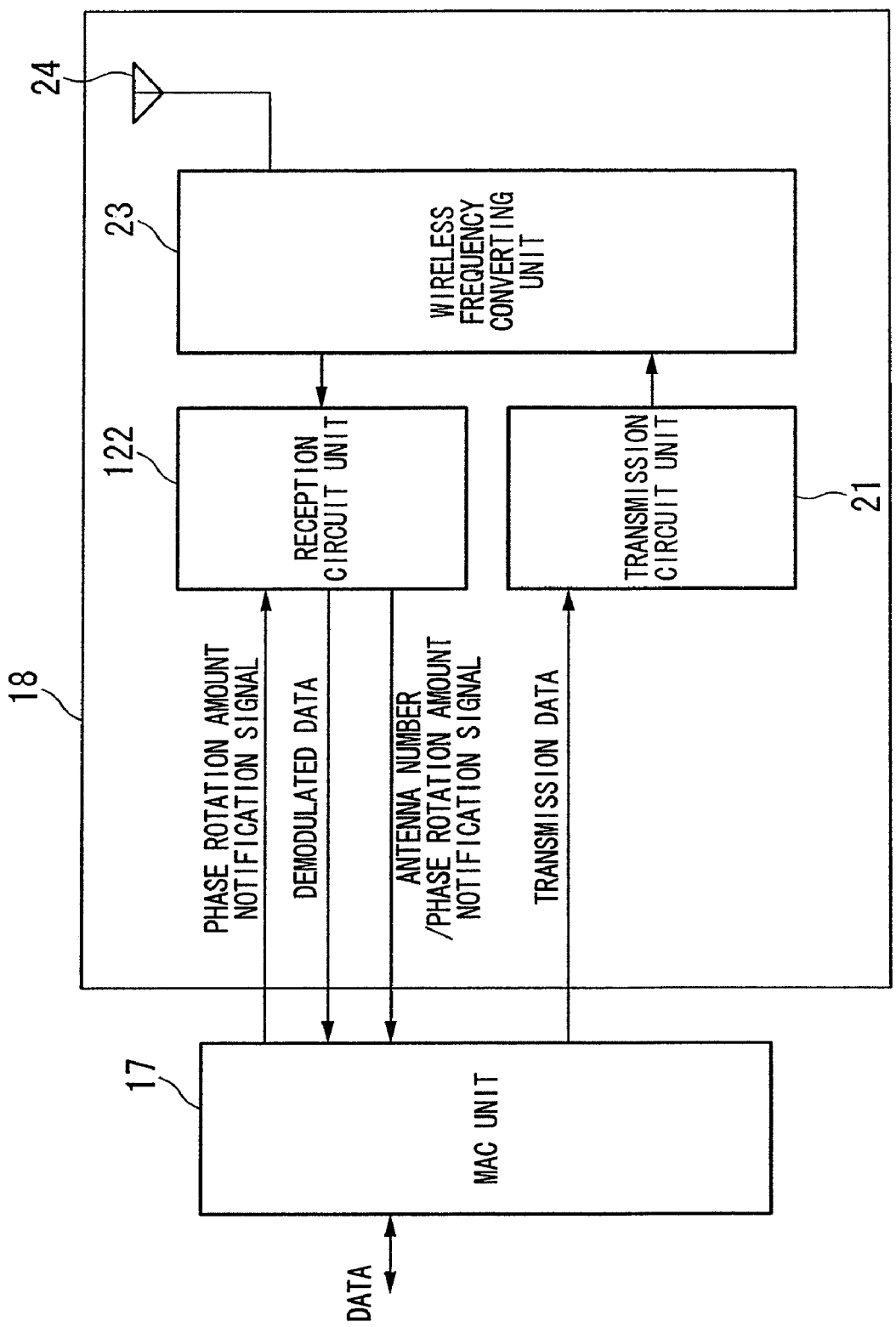
FIG. 26 is a diagram showing a terminal apparatus of the second embodiment.
Figure 27:
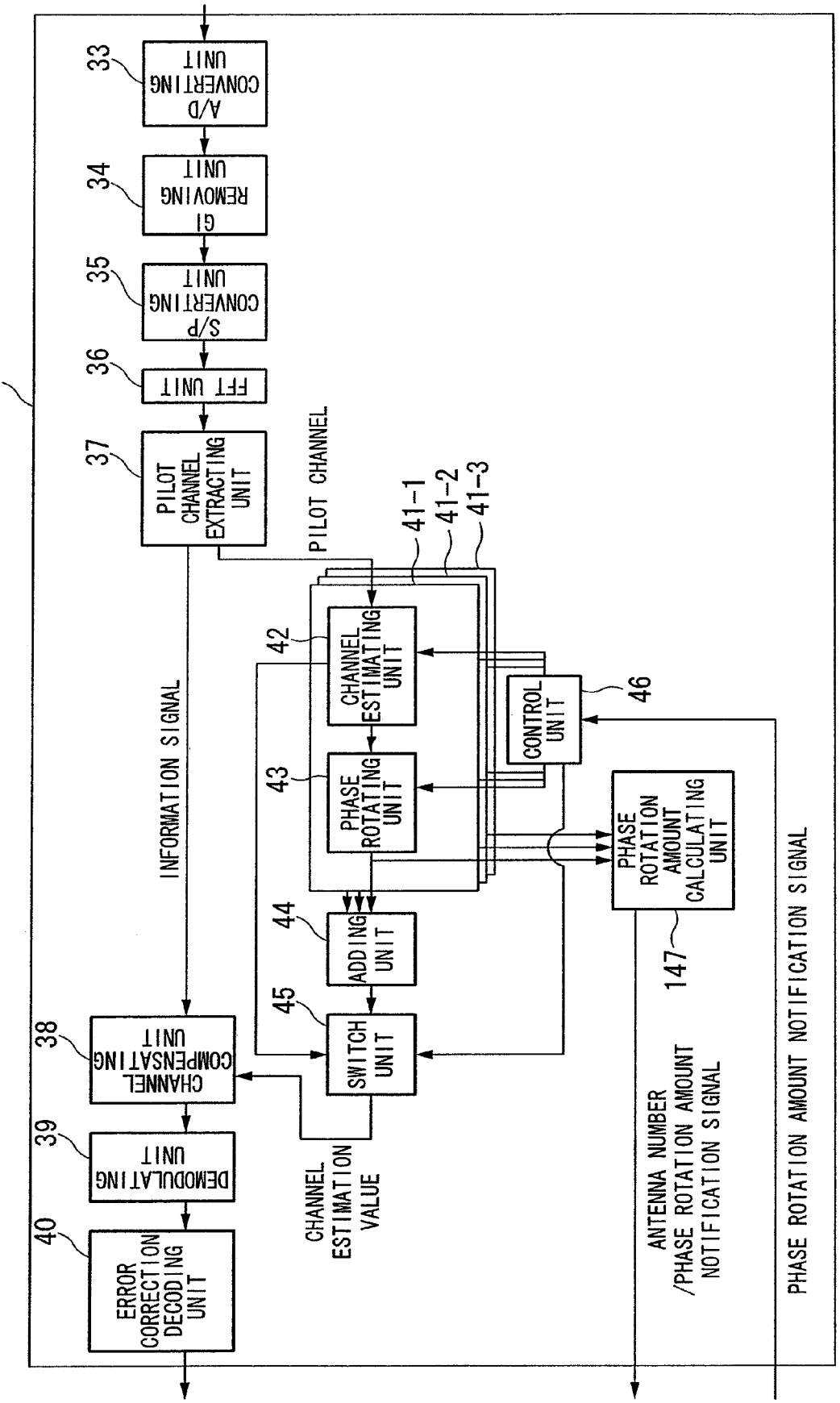
FIG. 27 is a diagram showing a receiver circuit unit included in the terminal apparatus of the second embodiment.

Subsequently, the apparatus configuration of the terminal apparatus of the present embodiment is shown in FIG. 26. The terminal apparatus recited in FIG. 26 is substantially the same as that described in the first embodiment with reference to FIG. 14, but differs in that the reception circuit unit 122 is different and an antenna number/phase rotation amount notification signal shown in FIG. 25 is notified from the reception circuit unit 122 to the MAC unit 17. Moreover, the MAC unit 17 uses the antenna number/phase rotation amount notification signal as transmission data, the transmission circuit unit 21 performs modulation processing and performs communication with the base station. Subsequently, the reception circuit unit 122 shown in FIG. 26 is now described in detail with reference to FIG. 27. FIG. 27 is substantially the same as FIG. 15, with the exception that the inversion antenna selecting unit 47 is replaced by a phase rotation amount calculating unit 147. The phase rotation amount calculating unit 147 calculates the phase rotation amount required to align the phases at respective antennas with the transfer function H1 as shown in FIG. 23 and FIG. 24 using the output of the phase rotating unit 43, and notifies the MAC unit 17 as the antenna number/phase rotation amount notification signal. Alternatively, the output of the averaging unit 49 can be input into the phase rotation amount calculating unit 147 in the same manner as in FIG. 16 of the first embodiment.

Figure 28:
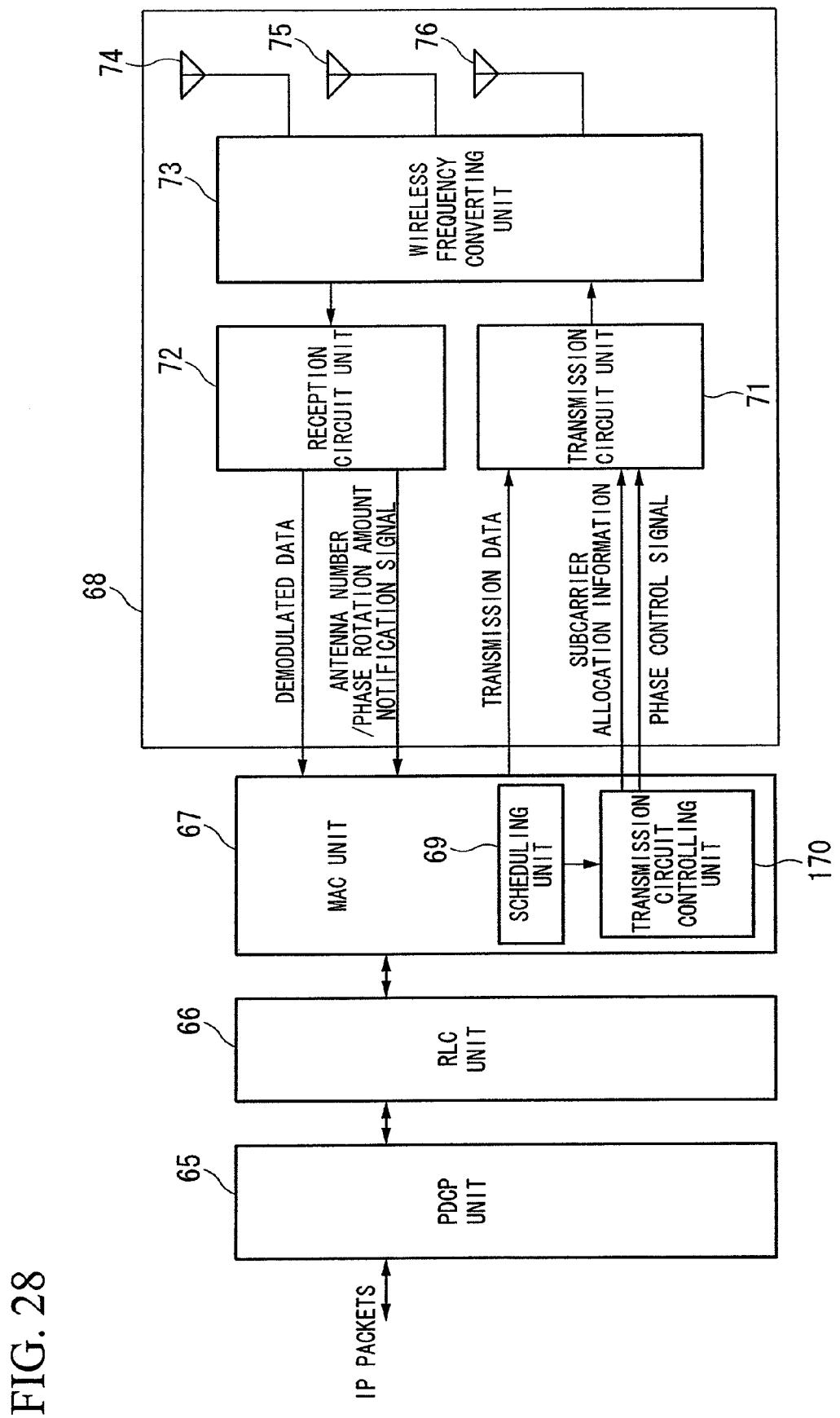
FIG. 28 is a diagram showing a base station apparatus of the second embodiment.

Next, the structure of the base station apparatus in the present embodiment is described with reference to FIG. 28. The construction of FIG. 28 is substantially the same as that of FIG. 18 of the first embodiment, but differs in that a transmission circuit controlling unit 170 controls the transmission circuit unit 71 using the antenna number/phase rotation amount notification signal notified from the reception circuit unit 72. The transmission circuit unit 71 is the same as that described in FIG. 19, and will not be described in the present embodiment. Moreover, the phase control information with which the transmission circuit controlling unit 170 controls the transmission circuit unit 71 can be expressed in the manner shown in FIG. 29. FIG. 29 is substantially the same as FIG. 20 of the first embodiment, differing only the data signal portion for the antennas designated antennas number 2 and 3, in that 2πmT/Ts+θ2 is used as the phase control information for antenna number 2, and 2πm2T/Ts+θ3 is used as the phase control information for antenna number 3. The phase control information shown in FIG. 30 could also be used. The phase control information in FIG. 30 is substantially the same as that in FIG. 29, with the exception of the phase control information related to the pilot channels at antenna numbers 2 and 3. In this case, phase control is performed not only by phase control information related to the data signal included in the antenna number notification signal notified from the terminal, but also by phase control information related to the pilot channel of θ2 for antenna number 2 and θ3 for antenna number 3, the use of phase control information such as in FIG. 30 provides the distinction from FIG. 29.

Thus, by using a communication system including the terminal apparatus and base station apparatus set forth in the present embodiment, even when the maximum delay time between antennas is small particularly shown in FIG. 3, a large multi-user diversity effect can be obtained by performing the phase control described in the present embodiment.

While embodiments of the present invention have been described above with reference to the drawings, the specific structures are not limited to those in the embodiments, and also include design within a scope which does not depart from the gist of this invention.

INDUSTRIAL APPLICABILITY

The present invention is well suited to use in a communication system that performs multi-carrier transmission between a terminal apparatus and a base station apparatus and performs scheduling by dividing into multiple blocks in frequency and time domains, but is not limited to this.

The invention claimed is:

1. A wireless receiver for receiving a signal from a wireless transmitter including a plurality of transmission antennas in a transmission system in which scheduling of users is performed on a per-chunk basis where a region defined in a frequency domain and in a time domain is divided into chunks in the frequency domain and in the time domain, the wireless receiver comprising:
a reception unit configured to, in the case in which the frequency bandwidth of the chunk is Fc, receive a) data to which phase rotation for controlling the maximum delay time between the plurality of transmission antennas is added so that the maximum delay time is set to either a predetermined first value which is smaller than 1/Fc or a predetermined second value which is larger than 1/Fc depending on whether transmission is performed using frequency diversity or transmission is performed using multi-user diversity and b) pilot channels corresponding to the plurality of transmission antennas which are orthogonal to each other; and
a demodulating unit configured to demodulate the data based on transfer functions calculated using the pilot channels.

2. The wireless receiver as recited in claim 1, wherein the first value is zero.

* * * * *